US012533323B2

(12) United States Patent
Sutton et al.

(10) Patent No.: US 12,533,323 B2
(45) Date of Patent: Jan. 27, 2026

(54) SLOW-RELEASE FORMULATION

(71) Applicant: GLYCOSCIENCE, S.L., Derio (ES)

(72) Inventors: Peter William Sutton, Sant Cugat del Vallès (ES); Lluís Bosch Hereu, Santa Maria de Palautordera (ES)

(73) Assignee: GLYCOSCIENCE, S.L., Derio (ES)

( * ) Notice: Subject to any disclaimer, the term of this patent is extended or adjusted under 35 U.S.C. 154(b) by 0 days.

(21) Appl. No.: 18/290,244

(22) PCT Filed: Nov. 24, 2022

(86) PCT No.: PCT/EP2022/083096
§ 371 (c)(1),
(2) Date: Nov. 10, 2023

(87) PCT Pub. No.: WO2023/099327
PCT Pub. Date: Jun. 8, 2023

(65) Prior Publication Data
US 2024/0238216 A1 Jul. 18, 2024

(30) Foreign Application Priority Data
Nov. 30, 2021 (EP) .................... 21383077

(51) Int. Cl.
A61K 31/047 (2006.01)
A01N 31/06 (2006.01)
A01P 17/00 (2006.01)
A61K 47/02 (2006.01)
A61K 47/26 (2006.01)

(52) U.S. Cl.
CPC ............ A61K 31/047 (2013.01); A01N 31/06 (2013.01); A01P 17/00 (2021.08); A61K 47/02 (2013.01); A61K 47/26 (2013.01)

(58) Field of Classification Search
CPC ..................................... A01P 17/00
See application file for complete search history.

(56) References Cited

U.S. PATENT DOCUMENTS

| | | | |
|---|---|---|---|
| 4,774,082 | A | 9/1988 | Flashinski et al. |
| 5,959,161 | A | 9/1999 | Kenmochi et al. |
| 6,180,127 | B1 | 1/2001 | Calton et al. |
| 6,846,491 | B1 | 1/2005 | Richards |
| 2004/0014811 | A1 | 1/2004 | Meyer et al. |
| 2004/0247708 | A1 | 12/2004 | Clarke |
| 2007/0178048 | A1* | 8/2007 | Clarke ............... A61P 31/16 424/45 |

FOREIGN PATENT DOCUMENTS

| | | |
|---|---|---|
| CN | 108341740 A | 7/2018 |
| EP | 0 348 550 A2 | 1/1990 |
| EP | 0 934 741 A1 | 8/1999 |
| EP | 2 439 188 A1 | 4/2012 |
| EP | 2 862 442 A1 | 4/2015 |
| GB | 2581375 A | 8/2020 |
| JP | 1-213291 A | 8/1989 |
| JP | 2000-96078 A | 4/2000 |
| WO | 91/07171 A1 | 5/1991 |
| WO | 99/00377 A1 | 1/1999 |
| WO | 01/05226 A1 | 1/2001 |
| WO | 2007/082306 A2 | 7/2007 |
| WO | 2010/144755 A2 | 12/2010 |
| WO | 2016/071521 A1 | 5/2016 |
| WO | 2017/081445 A1 | 5/2017 |
| WO | 2021/160670 A1 | 8/2021 |

OTHER PUBLICATIONS

Leaf Juice Skin Care Bug Spray https://leafjuiceskincare.com/sun-bugs/bug-spray/ Accessed Jul. 23, 2021 (Year: 2021).*
Efficacy of orange peel as a mosquito repellent Gupta et al. International Journal of Home Science 2017; 3(2): 143-146 (Year: 2017).*
Protection of Paper and Textile Products from Insect Damage Block Industrial and Engineering Chemistry vol. 43, No. 7 (Year: 1951).*
Bug Spray Leaf Juice Skin Care Accessed Jul. 23, 2021 (Year: 2021).*
Comparison of Mosquito Repellent Activity of Citric Acid Treated and Untreated Samples of the Oil Of Eucalyptus citriodora Perera et al. Department of Chemistry, University of Colombo, Colombo 3, Sri Lanka. 2017 (Year: 2017).*
International Search Report issued Apr. 12, 2023 in International Application No. PCT/EP2022/083096.
Written Opinion issued Apr. 12, 2023 in International Application No. PCT/EP2022/083096.
European Search Report completed Apr. 19, 2022 in European Application No. 21 38 3077.
Stephen S. Barasa, et al., "Repellent Activities of Stereoisomers of p-Menthane-3,8-diols Against *Anopheles gambiae* (Diptera: Culicidae)", Journal of Medical Entomology, Sep. 2002, vol. 39, No. 5, pp. 736-741 (6 pages total).
Lorenzo G. Borrego, et al., "Effect of the Stereoselectivity of para-Menthane-3,8-diol Isomers on Repulsion toward *Aedes albopictus*", J. Agric. Food Chem., 2021, vol. 69, No. 37, pp. 11095-11109 (15 pages total).
Scott P. Carroll, et al., "PMD, a Registered Botanical Mosquito Repellent with Deet-Like Efficacy", J. of the American Mosquito Control Association, Sep. 1, 2006, vol. 22, No. 3, pp. 507-514, Abstract (1 page total).

(Continued)

Primary Examiner — Jeffrey S Lundgren
Assistant Examiner — Eric Tran
(74) Attorney, Agent, or Firm — Haynes and Boone, LLP

(57) ABSTRACT

The present invention relates to a slow release formulation. It relates also to the use of said repellent formulation, to a method of use thereof, and to a composition comprising said formulation. It further relates to PMD glucovanillin conjugate compound of formula (II), a process for preparing the compound of formula (II), and further to the use of the compound of formula (II) for the controlled release of PMD. It refers also to a process for isolating racemic cis/trans-PMD from an extract containing PMD.

16 Claims, 3 Drawing Sheets

(56) References Cited

OTHER PUBLICATIONS

Figure 1:
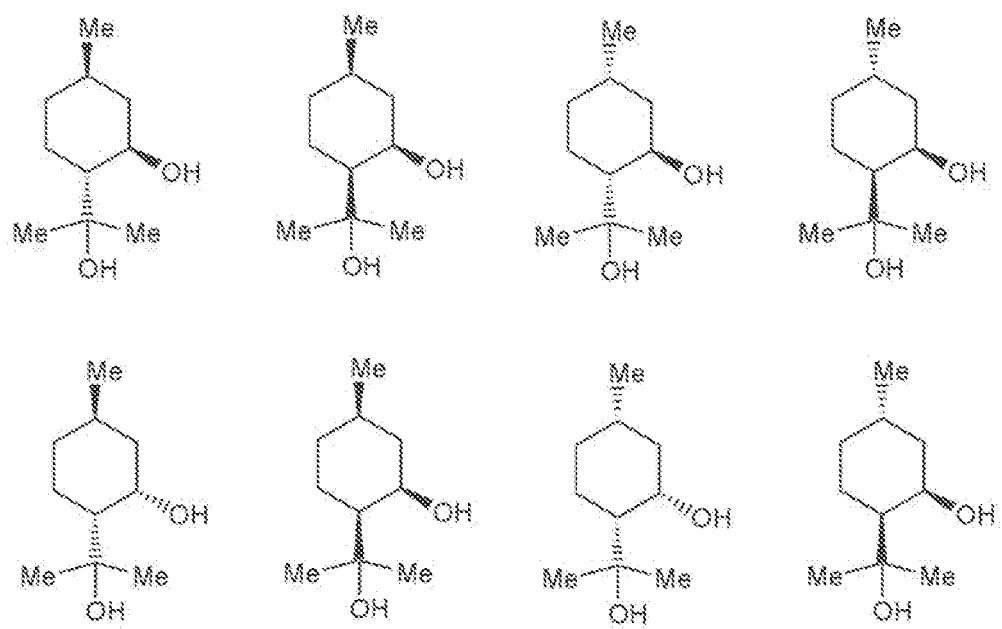

Donald R. Barnard, et al., "Laboratory Evaluation of Mosquito Repellents Against *Aedes albopictus, Culex nigripalpus*, and *Ochlerotatus triseriatus* (Diptera: Culicidae)", Journal of Medical Entomology, Jul. 2004, vol. 41, No. 4, pp. 726-730 (5 pages total).
Howard E. Zimmerman, et al., "Stereoisomerism of Isopulegol Hydrates and Some Analogous 1,3-Diols", J. Am. Chem. Soc., May 20, 1953, vol. 75, pp. 2367-2370 (4 pages total).
Yoshifumi Yuasa, et al., "A Practical and Efficient Synthesis of p-Menthane-3,8-diols", Organic Process Research & Development, 2000, vol. 4, pp. 159-161 (3 pages total).

* cited by examiner

| Insect repellent compound | Chemical structure |
|---|---|
| DEET | |
| Icaridin (picaridin) | |
| DEPA | |
| IR3535 | |
| N-butyl acetanilide | |
| MGK Repellent 264 | |
| N-Methylneodecanamide | |
| AI3-35765 | |

Figure 2.1

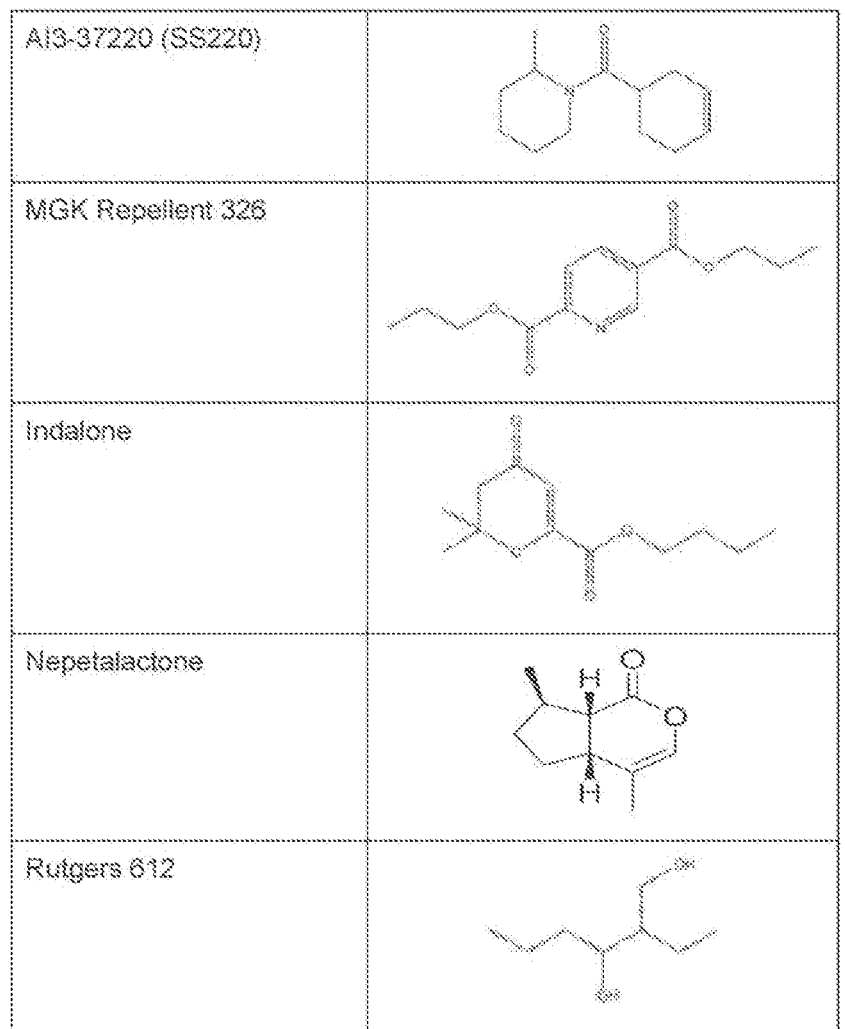
Figure 2.2

SLOW-RELEASE FORMULATION

CROSS REFERENCE TO RELATED APPLICATIONS

This application is a National Stage of International Application No. PCT/EP2022/083096 filed on Nov. 24, 2022, claiming priority based on European Patent Application No. 21383077.1 filed on Nov. 30, 2021.

TECHNICAL FIELD

The present invention relates to a slow-release formulation, in particular to an insect repellent formulation having a long duration effect.

BACKGROUND ART

Land and air-borne arthropods represent the most common vectors for the transmission of disease to humans. Due to increasing global temperatures, there has been an expansion in the number of regions affected by these diseases as they become suitable habitats for their respective vectors.

One method of combating bites from these arthropods, and more specifically insects, is to use insect repellents. The active ingredients currently used in most commercially available topical insect repellents are spatial repellents. There are several approved synthetic topical insect repellents on the market including DEET (N,N-diethyltoluamide), Picaridin and IR3535, but none of them is ideal. For example, DEET has a pungent odour, leaves a waxy feel and can dissolve plastics and synthetic fabrics. Furthermore, there is a public perception that these synthetic molecules are harmful to the health resulting in a rapidly growing market for natural alternatives.

A wide range of natural molecules are known to provide an insect repellent effect, but the majority are too volatile and provide protection for only a very short time-period. In fact, p-menthane-3,8-diol (PMD), which is active against a wide variety of insects, is the only natural insect repellent recognized by the World Health Organisation, being sufficiently high boiling to allow slow evaporation over a number of hours.

Commercial repellent products typically have an effective duration of between 4 and 6 hours after each application. However, as the insect species of concern in a given environment are displaced by other invasive species, established commercially available repellent products may no longer provide suitable protection. Using one non-limiting example, commercially available topical insect repellents have been designed to combat mosquitos that bite in the morning or evening where a short duration of action is suitable. With the unprecedented expansion in the population of the daytime feeding *Aedes* species of mosquito (commonly known as the Asian tiger mosquito), responsible for the transmission of Zika, Dengue and Chikingunya viruses, multiple applications of currently available repellents and formulations are required. Due to busy lifestyles, periodic repellent application is easily forgotten until bitten, leaving the user open to disease contraction. To mitigate this issue, traditional repellent products containing increased concentrations of active ingredient can be applied, but increased exposure can lead to multiple issues such as toxicity and irritancy.

Topical and spatial repellents are volatile molecules that, upon evaporation, provide a protective zone above the skin or in the surrounding area that prevents mosquitos from landing and/or biting through complex mechanisms that are not fully understood. Each active ingredient has a minimum effective evaporation rate (MEER). A rate of evaporation above this threshold results in non-productive loss, reducing the time-period during which the repellent is effective, after which the concentration is no longer sufficient to meet the MEER.

The development of insect repellent products that allow the controlled release of their active ingredients should overcome many issues related to current ones by increasing duration whilst at the same time reducing the concentration of active ingredient required. Due to the lower quantity of active ingredient required, this would result in additional benefits such as reduction in smell, reduced irritancy and avoidance of the greasy feel often associated with such products.

Furthermore, such methods would be attractive because they would potentially allow other natural repellents, which cannot currently be used due to their higher volatility, to be employed which is important as a wider range of viable repellent molecules could reduce incidents of resistance.

Two main technical solutions have been disclosed in the art for the slow release of insect repellents: entrapment approach and precursor approach.

In the entrapment approach, slow release of the insect repellent is obtained by entrapment, for example, within microcapsules (e.g., EP-A-0348550), liposheres (EP-A-0502119), polymer (U.S. Pat. No. 4,774,082) or copolymer (U.S. Pat. No. 6,180,127) matrices from which the active ingredient is slowly released over time from the surface of interest following application of the repellent product to the whole surface or, as in the case of repellent bracelets, to a zone of the body.

In the precursor approach, altering the physicochemical characteristics of the active ingredient by preparation of a prodrug or conjugation to an appropriate carrier molecule offers an alternative method of controlled release, where the active ingredient is released by environmental mechanisms which can prolong the time during which the MEER is maintained whilst at the same time avoiding the need to apply a large excess of the active ingredient.

The use of precursors, such as prodrugs and conjugates, is well-known in the pharmaceutical field. Regarding insect repellent actives, the conjugation of volatile insect repellent molecules to compounds that reduce the water solubility, such as fatty acids (US-A-2004/014811), the preparation of water-soluble ester and ether prodrugs (EP-A-2439188), five and six-membered ring cyclic acetals as insect repellent precursors (WO-A-99/00377), water-soluble conjugates to one or more sugar rests (JP-A-2000-096078, JP-A-H01-213291), conjugates to polycarboxylic acids or polyols to improve water solubility (WO-A-2016/071521), conjugates to hyaluronic acid (WO-A-2016/071521), conjugates to crystalline carriers (WO-A-2010/144755), conjugates to crosslinked, polymeric gel composition (U.S. Pat. No. 6,846,491), conjugates to vanillin (WO-A-2007082306, WO-A-2017/081445), conjugates to ketones or aldehydes (GB-A-2581375), and 3'-ketoglycosides (WO-A-2021/160670) have been disclosed.

European patent application EP-A-2862442 discloses a composition comprising at least one monoterpenoid, at least one acid and at least one emulsifier.

Such prior art methods show disadvantages regarding the effective extended-release application of insect repellent.

Despite the various proposals available in the state of the art, there is still a need for new formulations to be used for the slow-release of active materials, which show sufficient release rate of the active to perform the effect, in particular a repellent effect.

The selective isolation of cis-PMD and/or trans-PMD represents a challenge for the skilled person in un the art, and several proposals have been disclosed in the art.

For example, in CA-A-108341740 it is disclosed a method for preparing PMD, which is characterized in that citronellal is used as a raw material, and graphene oxide is used as a catalyst, and water is used as a solvent, and the cis- and trans-configuration of said PMD is purified by dissolving it in an organic solvent, which is ethyl acetate, n-hexane or mixtures thereof at a temperature 50-80° C., and then the temperature is lowered to room temperature to obtain crystals of cis-PMD, and from the mother liquor is obtained trans-PMD.

In U.S. Pat. No. 5,959,161 it is disclosed a method or producing para-menthane-3,8-diol comprising the step of treating citronellal with an aqueous sulfuric acid solution of 0.02 to 1.0 weight % in concentration, afterwards, cis- and trans-PMD are separated by column chromatography using a mixed solvent of ether and n-hexane.

Thus, it is necessary to have an efficient process for isolating cis- and/or trans-PMD.

OBJECT OF THE INVENTION

The object of the present invention is a slow-release formulation.

Another aspect of the invention is the use of said formulation.

Another aspect of the invention is the slow release formulation for use as medicament.

Another aspect of the invention is a method of use of said formulation.

Another aspect of the invention is a composition comprising said formulation.

Another aspect of the invention is the use of the PMD glucovanillin acetal compound of formula (II) for the controlled release of PMD.

Another aspect of the invention is a process for isolating racemic cis/trans-PMD.

FIGURES

FIG. 1 shows the eight stereoisomers of PMD.
FIGS. 2.1 and 2.2 show the chemical structures of further insect repellent compounds.

DETAILED DESCRIPTION OF THE INVENTION

The object of the present invention is a slow-release formulation, which comprises:
a) p-menthane-3,8-diol (PMD),
b) a glycoside,
c) an organic acid, and
d) a divalent metal halide salt The authors of the present invention have developed a formulation comprising PMD, a glycoside, an organic acid and a divalent metal halide salt, which can release PMD on surfaces, such as human skin. Surprisingly, due to a more linear release profile, the formulation of the invention is able to release an effective concentration of PMD, a volatile alcohol, on human skin to act, for example, as insect repellent, over a long period, which usually lasts at least 24 hours, i.e., greater than observed by the delivery of the free repellent alcohol.

The authors of the present invention have developed a formulation comprising a glycoside, which provides an extended release compared to free PMD, when combined with free PMD, an organic acid and a divalent metal halide salt.

As shown in the examples, different glycosides are suitable for the slow release of PMD, such as, for example, methyl-α-glucoside, hexyl glucoside, phenyl-β-glucoside, geranyl-β-glucoside, methyl-α-D-mannopyranoside, methyl-α-D-galactopyranoside, and PMD glucovanillin acetal.

In the present description, as well as in the claims, the singular forms "a", "an" and "the" include the plural reference unless the context clearly indicates otherwise. The ranges defined by the preposition the terms "between . . . and . . . " or by the terms "from . . . to . . . " include also the two ends thereof. The term "about" refers to a deviation of plus/minus 10%, preferably plus/minus 5%. The percentages are expressed in % by weight (wt. %), unless stated the contrary.

According to the IUPAC, the term "moiety" is used to signify part of a molecule.

As used herein, the term "repellent" refers to any substance or mixture of substances used to repel any insect. Herein, the repellent as defined has a preferred use to repel flying insects (e.g., mosquitoes). However, it is anticipated that the insecticide formulation described can also be effective against mites, ticks (Lyme disease), and numerous other insects and their eggs and larvae.

PMD

Alcohol 2-(2-hydroxypropan-2-yl)-5-methylcyclohexan-1-ol is also known as p-menthane-3,8-diol (PMD), and it corresponds to the following structure (I):

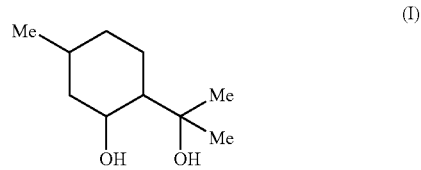 [SMILES: CC1CCC(C(C)(C)O)C(O)C1]

In the context of the invention, the term "PMD" refers to p-menthane-3,8-diol and represents any stereoisomer, racemic blends or diastereomeric mixtures derived from compound of formula (I).

The PMD for use in the present invention may be derived from a natural source, synthetic, or a mixture thereof. The PMD for use in the present invention may be a substantially pure form of the compound, i.e., NMR or GC purity higher than 95%, 97%, or 99%, a crude extract, or a chemically modified crude extract, for example, by treatment under acidic conditions of a crude extract from a natural source.

The purity of PMD may be determined by GC using a method disclosed in the literature, for example, in Barasa et al., Repellent Activities of Stereoisomers of p-Menthane-3, 8-diols Against Anopheles gambiae (Diptera: Culicidae), J. Med. Entomol., 2002, 39(5), 736-741.

The purity of PMD may be determined by NMR using a method disclosed in the literature, for example, in Borrego et al., Effect of the Stereoselectivity of para-Menthane-3,8-diol Isomers on Repulsion toward *Aedes albopictus*. J. Agric. Food Chem., 2021, 69(37), 11095-11109.

It is known that PMD exists in two geometric isomeric forms, namely the cis and trans isomers. Altogether, there are 8 isomers of PMD, as disclosed in FIG. 1. This invention encompasses any single one isomer and also any combination of one or more isomers.

Racemic-cis-PMD is composed of a mixture of the following enantiomers:

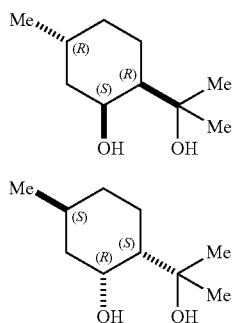

Racemic-trans-PMD is composed of a mixture of the following enantiomers:

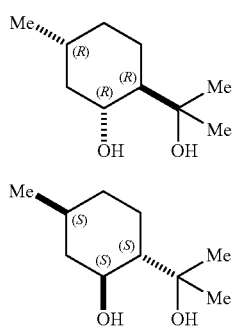

Different stereoisomers of PMD, alone, as racemic blends or diastereomeric mixtures, show a repellent effect, as disclosed in Barasa op. cit. The different isomers show a difference in repellent effect towards *Aedes albopictus* mosquitos according to Borrego op. cit. Insect repellent properties of PMD are also disclosed in Carroll et al., PMD a Registered Botanical Mosquito Repellent with DEET-Like Efficacy, J. Am. Mosquito Control Assoc., 2006, 22(3), 507-514) or Barnard et al., Laboratory Evaluation of Mosquito Repellents Against *Aedes albopictus, Culex nigripalpus*, and *Ochlerotatus triseriatus* (Diptera. Culicidae), J. Med. Entomol., 2004, 41(4), 726-730.

Antiseptic, antibiotic, fungicidal, bactericidal, antiviral, and hair growth activity of PMD have also been disclosed, for example, in US-A-2004/0247708, US-A-2007/0178048, EP-A-0934741, WO-A-01/05226. Smither et al., Investigative study into whether an insect repellent has virucidal activity against SARS-CoV-2, Microbiol. Soc., 2021, 102(4) (DOI 10.1099/jgv.0.001585).

Racemic PMD and enantiomers thereof are commercially available through, for example, Takasago, Sigma-Aldrich, Parchem, or BOC Sciences, or can be prepared according to the procedure disclosed in Barasa et al., op. cit. of in Zimmerman et al., J. Am. Chem. Soc., 1953, 75, 2367-2370, or in Yuasa et al., Org. Proc. Res. Devel., 2000, 4(3), 159-161. PMD may also be derived by acid modification of the oil of *Corymbia citriodora* (the lemon *eucalyptus*), also known as *Eucalyptus citriodora* oil, hydrated, cyclized, which is grown commercially (e.g., commercially grown in Brazil and other Latin American countries). Citriodiol® (Citrefine), which is a product formed from a simple chemical modification under acidic conditions of the extract of the leaves of *Corymbia citriodora*. It comprises about 70 wt. % of a mixture of racemic-cis- and racemic-trans-PMD. This commercial product further comprises minor amounts of linear and cyclic terpenoid components, such as citronellal, citronellol and isopulegol isomers. *Eucalyptus citriodora* oil, hydrated, cyclized is also commercialised by other suppliers such as Chemian Technology SARL (Acting for Chemian Technology Limited (UK) and Fulltec GmbH.

In an embodiment, PMD is selected from any of the eight stereoisomers of PMD, racemic-cis-PMD, racemic-trans-PMD, and mixtures thereof.

In an embodiment, PMD is a mixture of racemic-cis-PMD and racemic-trans-PMD.

In an embodiment, PMD is selected from racemic-trans-PMD and racemic-cis-PMD, which provides a low odour odour-free controlled release formulation.

In an embodiment, PMD is racemic-trans-PMD.

In an embodiment, PMD is racemic-cis-PMD. Said compound is simpler to produce than racemic-trans-PMD, gives a slower release from the formulations of the invention than pure cis/trans-PMD mixture and has a much lower odour than Citriodiol®.

In an embodiment, PMD is selected from enantiomer of formula (Ia), enantiomer of formula (Ib), enantiomer of formula (Ic), and enantiomer of formula (Id).

In an embodiment, PMD is a chemically modified crude natural extract of *Corymbia citriodora*.

Glycoside

The formulation of the invention comprises a glycoside. The glycoside incorporated to the slow-release formulation of the invention is capable of effectively releasing PMD at a controlled rate, when applied to a surface and when present in combination with an organic acid and a divalent metal halide salt. Said PMD, which is present in free form in the slow-release formulation, is an efficient insect repellent having a long duration effect, as shown in the examples, and also shows antiseptic, antibiotic, fungicidal, bactericidal, antiviral, and hair growth activity, as exposed above.

In the sense of the present invention, the term "glycoside" refers to mixed acetals (ketals) derived from cyclic forms of a reducing sugar compound, wherein the anomeric hydroxy group is replaced by a group —OR. The compound ROH is termed "aglycone", and the carbohydrate residue itself is referred to as "the glycone".

In the case, the sugar is glucose, terms "glucoside" and "glucopyranoside" are used indistinctly.

In an embodiment, the glycoside is a reducing sugar attached to a non-carbohydrate through a glycosidic linkage, wherein the glycosidic linkage may be either alpha ($\alpha$) or beta ($\beta$), and wherein the sugar is a monosaccharide, a saccharide with a degree of polymerization comprised between 1.1 and 1.9, a disaccharide, or a trisaccharide.

In an embodiment, the reducing sugar is selected from monosaccharides, disaccharides, and trisaccharides.

In an embodiment, the reducing sugar is a monosaccharide selected from L- and D-sugars.

In an embodiment, the reducing sugar is a monosaccharide selected, for example, from glucose, galactose, allose, altrose, mannose, gulose, idose, tallose, fucose, xylose and 2-deoxyglucose, N-acetylglucosamine, and mixtures thereof; preferably from D-glucose, D-galactose, D-allose, D-altrose, D-mannose, D-gulose, D-idose, D-tallose, and mixtures thereof; more preferably D-glucose or D-galactose; and yet more preferably the sugar is D-glucose.

In an embodiment, the reducing sugar is a disaccharide selected, for example, from lactose, maltose, cellobiose, chitobiose, kojibiose, nigerose, isomaltose, sophorose, laminaribiose, gentiobiose, turanose, maltulose, leucrose, isomultulose, gentiobiulose, mannobiose, melibiose, rutinose, rutinulose, xylobiose, and mixtures thereof; preferably lactose or maltose; and more preferably lactose.

In an embodiment, the reducing sugar is a trisaccharide selected, for example, from nigerotriose, maltotriose, maltotriulose, and mixtures thereof; preferably maltotriose.

In an embodiment, a primary hydroxy group present in the sugar may be functionalized as ether, amine, ester, amide, sulphate, phosphate, carbonate or carbamate.

In an embodiment, the non-carbohydrate (aglycone) moiety is an alcohol rest (—OR). The alcohol (ROH) may be selected from aliphatic or aromatic alcohols. A saccharide with a degree of polymerization comprised between 1.1 and 1.9, preferably between 1.2 and 1.6, is the sugar moiety of an alkyl polyglycoside, which is an industrial product obtained from renewable raw materials when the alcohol rest is selected from a $C_8$-$C_{18}$ hydrocarbon chain. Preferably the sugar moiety is glucose.

In a preferred embodiment, the glycoside is selected from methyl-α-glucoside, hexyl glucoside, phenyl-β-glucoside, geranyl-β-glucoside, methyl-α-D-mannopyranoside, methyl-α-D-galactopyranoside, and PMD glucovanillin conjugate; preferably selected from methyl-α-glucoside and PMD glucovanillin conjugate.

In an embodiment, the glycoside is methyl-α-glucoside.

In an embodiment, the glycoside is PMD glucovanillin conjugate.

PMD Glucovanillin Conjugate Compound

The PMD glucovanillin conjugate compound of formula (II) is:

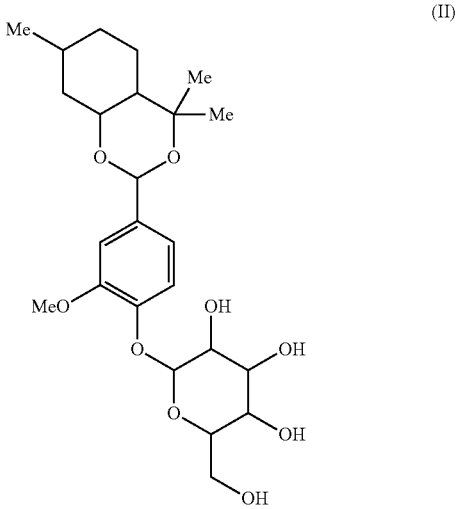 [SMILES: COc1cc(C2OC3CC(C)CCC3C(C)(C)O2)ccc1OC1OC(CO)C(O)C(O)C1O]

(II)

In the present description, compound of formula (II) can be indistinctly named PMD glucovanillin conjugate, where the relative stereochemistry is undefined; cis-PMD glucovanillin conjugate, cis-PMD acetal or cis-acetal where the compound is formed using cis-PMD; trans-PMD glucovanillin conjugate, trans-PMD acetal, or trans-acetal where the compound is formed using trans-PMD.

In an embodiment PMD is selected from any of the eight stereoisomers of PMD, racemic-cis-PMD, racemic-trans-PMD, and mixtures thereof, preferably PMD is a mixture of racemic-cis-PMD and racemic-trans-PMD, and wherein the sugar moiety is D-glucose.

In an embodiment, PMD is racemic-trans-PMD.

In a preferred embodiment of the PMD glucovanillin conjugate, PMD is a mixture of racemic-cis-PMD and racemic-trans-PMD, and the sugar moiety is glucose.

In a more preferred embodiment, the PMD glucovanillin conjugate compound of formula (II) is the conjugate, wherein PMD is a mixture of racemic-cis-PMD and racemic-trans-PMD, and the sugar moiety is glucose, preferably D-glucose.

Glucovanillin

Glucovanillin is the compound resulting from the functionalization of vanillin (4-Hydroxy-3-methoxybenzaldehyde, CAS Nr. 121-33-5) with a sugar moiety. If the sugar moiety is D-glucose, then the product is called glucovanillin (vanillin 4-O-β-D-glucoside, CAS Nr. 494-08-6).

Glucovanillin is a major natural product in many plants including vanillin pods and hydrolysed through a combination of endogenous and exogenous enzymes during natural vanillin production.

However, natural vanillin and thus, glucovanillin is very expensive due to the limited supply. Therefore, vanillin is primarily produced by synthetic methods and increasingly through biosynthetic methods, as disclosed, for example, in Garcia-Bofill et al., Enzymatic synthesis of vanillin catalysed by a eugenol oxidase, Applied Catalysis A, 2019, 582, 117117, neither of which employ glucovanillin as a precursor.

Glucovanillin can be produced from vanillin using traditional chemical methods, as disclosed in, for example, Fischer et al., Synthesis of certain glucosides, Berichte, 1909, 42(2), 1465-76 Further, chemical methods of O-glycosylation of aromatic alcohols (phenolic substrates) with diverse sugars are well known and disclosed, for example, in Jacobsson et al., Aromatic O-glycosylation, Carbohydrate Research, 2006, 341, 1266-1281.

Glucovanillin is also available commercially, for example, from Carbosynth Ltd.

The glucovanillin conjugate compound of formula (II) incorporated to the slow-release formulation of the invention is capable of effectively releasing PMD at a controlled rate, to be an efficient insect repellent.

Process for Preparing the PMD Glucovanillin Conjugate Compound of Formula (II)

The process for preparing the PMD glucovanillin conjugate compound of formula (II) comprises reaction of glucovanillin with PMD in the presence of a catalytic amount of an organic of inorganic acid, optionally in the presence of a solvent.

In a preferred embodiment, the acid catalyst is selected from citric acid and a sulphonic acid compound, such as a Dowex acidic resin.

In an embodiment, the formation of the acetal takes place without the presence of any solvent. In another embodiment, the reaction takes place in the presence of a solvent, preferably selected from acetonitrile and a $C_1$-$C_4$ alcohol, more preferably selected from acetonitrile and ethanol, and yet more preferably the solvent is ethanol.

Usually, the reaction takes place at a temperature between about 30° C. and about 60° C., preferably between about 40° C. and about 55° C., and more preferably about 50° C. In the solvent-free embodiment an initial heating is implemented to obtain a molten liquid from the starting products.

Surprisingly, given that the sugar is unprotected, no other acetals are observed to form to any significant extent by NMR, different from that represented by formula (II).

The cis/trans-PMD glucovanillin conjugate mixture can be tuned to the desired ratio by the proper choice of acid and solvent.

In an embodiment, using an excess of cis/trans-PMD mixture, the cis-PMD glucovanillin conjugate is formed almost exclusively using citric acid as catalyst and acetonitrile as solvent, whereas, by using a strong acid (for example, Dowex acidic resin) in the same solvent, a 1:0.5 mixture of cis/trans-PMD glucovanillin conjugates is obtained. In contrast, by using the same acids and ethanol as solvent, 1:0.7 and 1:1 mixtures of cis/trans-PMD glucovanillin conjugates are obtained respectively. Therefore, the reaction can be readily tuned to afford the desired isomeric product ratio by proper choice of reaction conditions, such as acid and solvent.

In an embodiment, the PMD glucovanillin conjugate is obtained from Citriodiol® and glucovanillin using Dowex acidic resin, filtering off the resin and then dissolving it in water.

In an embodiment, the PMD glucovanillin conjugate is also formed in neat Citriodiol® or Citriodiol® in a solvent, and may be used without isolation.

Use of the PMD Glucovanillin Conjugate Compound of Formula (II)

Another aspect of the object of the invention is the use of the PMD glucovanillin conjugate compound of formula (II) for the controlled release of PMD from the slow-release formulation of the invention.

The PMD glucovanillin conjugate, included in the slow-release formulation of the invention, may be applied to the treatment of a variety of indications such as repulsion of a broad range of, for example, mosquitos, flies, ticks, mites, midges, no-see-ums, head lice, and eggs and larvae thereof.

Organic Acid

The formulation of the invention comprises an organic acid. The organic acid incorporated to the slow-release formulation of the invention is capable of effectively releasing PMD when applied to a surface at a controlled rate when present in combination with a glycoside and a divalent metal halide salt. Free PMD, included in the formulation, is an efficient insect repellent having a long duration effect.

Organic acids suitable to be included in said formulation are sulfonic acids, monocarboxylic acids, dicarboxylic acids, tricarboxylic acids, hydroxycarboxylic acids, and amino acids.

In an embodiment, the organic acid is a sulfonic acid, for example, p-toluene sulfonic acid, benzene sulfonic acid or taurine.

In an embodiment, the organic acid is a carboxylic acid, for example, oxalic acid, malonic acid, succinic acid, fumaric acid, or benzoic acid.

In an embodiment, the organic acid is a hydroxycarboxylic acid, for example, lactic acid, tartaric acid, glycolic acid, malic acid, mandelic acid (2-hydroxy-2-phenylacetic acid), or citric acid.

In an embodiment, the organic acid is an amino acid, for example, glycine, alanine, valine, leucine, isoleucine, aspartic acid, asparagine, glutamic acid, glutamine, serine, threonine, methionine, cysteine, lysine, arginine, histidine, proline, phenylalanine, tyrosine or tryptophan.

In a preferred embodiment, the organic acid is selected from citric acid, succinic acid and anhydrous forms or hydrates thereof. In an embodiment it is used citric acid as anhydrous form or as hydrate, preferably monohydrate. In an embodiment, it is used succinic acid.

In an embodiment, the organic acid may be in equilibrium with the corresponding conjugated base, wherein the ratio between the species depends on the pH value of the formulation.

Divalent Metal Halide Salt

The formulation of the invention comprises a divalent metal halide salt. The divalent metal halide incorporated to the slow-release formulation of the invention is capable of effectively releasing PMD when applied to a surface at a controlled rate when present in combination with a glycoside and an organic acid, being an efficient insect repellent.

Divalent metal halide salts suitable to be included in the formulation of the invention are, for example, calcium chloride, magnesium chloride, magnesium bromide, zinc iodide, zinc chloride, zinc bromide, or cobalt chloride.

In an embodiment, the divalent metal halide salt is selected from zinc chloride, magnesium chloride and calcium chloride.

In an embodiment, the divalent metal halide salt is calcium chloride.

In an embodiment, the divalent metal halide salt is magnesium chloride.

In an embodiment, the divalent metal halide salt is zinc chloride.

Slow-Release Formulation

The slow-release formulation comprises PMD, a glycoside, an organic acid, and a divalent metal halide salt.

In an embodiment, the slow-release formulation comprises per mole of PMD:
a) between 0.01 and 2, preferably between 0.02 and 1.5, more preferably between 0.03 and 1.2, more preferably between 0.05 and 1, and yet more preferably between 0.07 and 0.75 mol of a glycoside.
b) between 0.05 and 3, preferably between 0.06 and 2.5, more preferably between 0.08 and 2, more preferably between 0.09 and 1.7, more preferably between 0.1 and 1.5 mol and yet more preferably between 0.12 and 1.24 mol of an organic acid, and
c) between 0.01 and 5 mol, preferably between 0.02 and 2 mol, more preferably between 0.03 and 1 mol, and yet more preferably between 0.06 and 0.58 mol of divalent metal halide salt.

In an embodiment, the slow-release formulation comprises PMD, a glycoside selected from methyl-α-glucoside, hexyl glucoside, phenyl-β-glucoside, geranyl-β-glucoside, methyl-α-D-mannopyranoside, methyl-α-D-galactopyranoside, and PMD glucovanillin conjugate; preferably selected from methyl-α-glucoside and PMD glucovanillin conjugate, an organic acid selected from citric acid and succinic acid, and a divalent metal halide salt selected from calcium chloride, magnesium chloride, magnesium bromide, zinc iodide, zinc chloride, zinc bromide, and cobalt chloride.

In an embodiment, the slow-release formulation comprises PMD, a glycoside selected from PMD glucovanillin conjugate and methyl-α-glucoside, an organic acid selected from citric acid and succinic acid, and a divalent metal halide salt selected from calcium chloride, magnesium chloride, and zinc chloride.

In an embodiment, the slow-release formulation comprises PMD, a PMD glucovanillin conjugate, citric acid and a divalent metal halide salt selected from calcium chloride, magnesium chloride, and zinc chloride.

In an embodiment, the slow-release formulation comprises PMD, methyl-α-glucoside, citric acid, and a divalent metal halide salt selected from calcium chloride, magnesium chloride, and zinc chloride.

In an embodiment, the slow-release formulation comprises PMD, a PMD glucovanillin conjugate, succinic acid and a divalent metal halide salt selected from calcium chloride, magnesium chloride, and zinc chloride.

In an embodiment, the slow-release formulation comprises PMD, methyl-α-glucoside, succinic acid, and a divalent metal halide salt selected from calcium chloride, magnesium chloride, and zinc chloride.

In an embodiment, the content of PMD in the slow-release formulation is able to deliver at least 0.1, preferably 0.2 mg of PMD per square centimetre of a surface.

The release of PMD is generally achieved by a variety of cosmetic compositions and devices that are widely used and known to those skilled in the art. Non limiting examples include solutions, creams, powders, pastes, sprays, lotions, films or impregnated into or onto materials such as wipes, masks and sticks, medical devices or surfaces.

Another aspect of the present invention is the use of slow-release formulation as insect repellent.

It forms also part of the invention the slow release formulation for use as medicament. In particular, for use as antiseptic, antibiotic, fungicidal, bactericidal, or antiviral.

As shown in the Examples section, the slow-release formulation of the invention provides surprisingly a slow and long release of PMD. The efficacy of the slow-release formulation is shown by assessing the insect repellent effect of PMD. Said formulation enables significantly improved long lasting insect repellent effect in comparison with commercial products, such as, for example, Mosiguard® and DEET (see Examples 11 and 17). As shown in Example 13 and in Example 19, trans-PMD and cis-PMD, respectively, give a controlled release repellent, showing a much lower smell compared to a Citriodiol® containing repellent.

It forms also part of the invention a method of use of the slow-release formulation, which comprises the application of said formulation, either directly or in the form of a composition, onto a surface.

The formulation of the invention may be applied to any surface such as soft surfaces such as skin, hair, clothes, plants, or crops, grain storage, or hard surfaces such as wood, synthetic materials, or ceramic materials. In an embodiment, the formulation is applied to skin.

The manufacture of formulations including PMD, a glycoside, an organic acid and a divalent metal halide is a matter of routine work for the skilled person. Information on the preparation of compositions in form of solutions, creams, pastes, powders, sprays, lotions, and films may be found in well-known handbooks, such as, for example, Remington The Science and Practice of Pharmacy, $20^{th}$ Ed, Lippincott Williams & Wilkins, 2000, Philadelphia, Part 5, Pharmaceutical Manufacturing.

Surprisingly, the slow-release formulation is able to release the free PMD present therein when combined with a glycoside, an organic acid and a divalent metal halide salt.

As shown in examples, the slow-release is obtained with different glucopyranosides (Example 7), different glycosides (Example 16), different organic acids (Examples 9 and 14), and different divalent metal halides (Example 15). Both in vitro (Example 17) and in vivo (Example 11) tests show the advantages of the slow-release formulations containing either Citriodiol® or pure PMD of the invention in comparison to commercially available compositions.

Composition

A composition comprising the slow-release formulation also forms part of the object of the invention.

In an embodiment the composition comprises the slow-release formulation and a cosmetically acceptable component.

As used herein, "cosmetically-acceptable" means that the product(s) or compound(s) which the term describes are suitable for use in contact with tissues (e.g., the skin) without undue toxicity, incompatibility, instability, irritation, allergic response, and the like. This term is not intended to limit the ingredient/product, which it describes to use solely as a cosmetic.

In an embodiment, the composition comprises:
a) between 5 wt. % and 80 wt. % of the slow-release formulation, and
b) between 20 wt. % and 95 wt. % of a cosmetically acceptable component, where the percentages of the components are adjusted so that the balance is 100%.

The composition preferably comprises between 10 wt. % and 75 wt. % of the slow-release formulation, more preferably between 15 wt. % and 70 wt. %, more preferably between 25 wt. % and 65 wt. %, and yet more preferably between 30 wt. % and 60 wt. %.

The composition comprises a cosmetically acceptable component, which in the context of the invention, is selected from a cosmetically acceptable vehicle, a cosmetic ingredient, and mixtures thereof.

A cosmetically acceptable vehicle (or carrier) is a vehicle in which the cosmetic ingredients are dissolved, emulsified, dispersed, or suspended. Said vehicle is selected from among water, a water-miscible non-aqueous vehicle, such as ethanol or isopropanol, and a water-immiscible non-aqueous vehicle, such as, for example, vegetable oil, fatty esters, medium chain triglycerides, or alkanes. Preferably the composition includes water as a vehicle.

In an embodiment, the cosmetic ingredient is preferably selected from: surfactants (emulsifiers), lipid compounds, emollients, factors of consistency, thickening agents, stabilizers, hydrotropes, preserving agents, essences, colorants, silicone compounds, fats, waxes, lecithins, phospholipids, UV sun protection factors, film-forming agents, and mixtures thereof.

The physical form of the composition for the use according to the invention is not important. Said composition may be made into a wide variety of product types that include but are not limited to solid and liquid compositions such as solutions, lotions, creams, gels, sticks, sprays, ointments, cleansing liquid washes and solid bars, shampoos, pastes, powders, foams, mousses, milks, emulsions, dispersions, suspensions, or wipes.

The topical compositions useful in the present invention may be formulated as solutions. Solutions may preferably include an aqueous solvent (e.g., from about 0 wt. % to about 95 wt. % or from about 20 wt. % to about 85 wt. % of a cosmetically acceptable aqueous solvent). More preferably, such compositions may contain about 20 wt. % aqueous solvent, although this may vary dependent upon the formulation Such solvents may include ethanol, isopropanol, glycerol (glycerin), propylene glycol, polyethylene glycol, mixtures thereof and the like, in combination with water. In an embodiment, the topical composition useful in the present invention may be formulated as a solution containing an emollient. Such composition preferably contains from about 2 wt. % to about 50 wt. % of an emollient. As used herein, "emollients" refer to materials used for the prevention or relief of dryness, as well as for the protection of the skin. In an embodiment, the solution is an anhydrous mixture comprising a non-aqueous solvent, comprising, for example, from about 20 wt. % to about 85 wt. % of a cosmetically acceptable non-aqueous solvent A lotion may be made from a solution. Lotions typically contain from about 1 wt. % to about 20 wt. % of an emollient and from about 60 wt. % to about 90 wt. % of water.

Another type of product may be a cream. A cream typically comprises from about 5 wt. % to about 50 wt. % of an emollient and from about 45 wt. % to about 85 wt. % of water.

Another type of product may be an ointment. An ointment may be constituted of a simple base of vegetable oils or semi-solid hydrocarbons. An ointment may contain from about 2 wt. % to about 100 wt. % of an emollient, and from about 0.1 wt. % to about 5 wt. % of a thickening agent.

The topical compositions useful in the present invention may also be preferably formulated as emulsions. In an embodiment, the composition contains water and a lipophilic phase and is presented in the form of emulsion or dispersion, such as, for example, the oil-in-water (O/W), water-in-oil (W/O) type, multiple emulsion (W/O/W), or PIT-type emulsion, or microemulsion. If the carrier is an emulsion, from about 1 wt. % to about 10 wt. % of the carrier should be made up one or more emulsifiers. Emulsifiers may be non-ionic, anionic, cationic, or amphoteric.

The topical composition useful in the present invention may be formulated as a gel. Suitable gelling agents for aqueous gels include, but are not limited to, natural gums, acrylic acid and acrylate polymers and copolymers, and cellulose derivatives (e.g., hydroxymethyl cellulose and hydroxypropyl cellulose). Suitable gelling agents for oils (such as vegetable oils, esters) include, but are not limited to, waxes, modified silicas, cellulose derivatives, polyamides, polyurethanes, and L-glutamic acid derivatives. Such gels typically comprise between about 0.1 wt. % and 20 wt. % of such gelling agents.

The composition useful for the use of the present invention are generally prepared by conventional methods such as are known in the art of making topical compositions. Such methods typically can involve mixing of the ingredients in one or more steps to a relatively uniform state, with or without heating, cooling, application of vacuum, and the like.

Surfactants (Emulsifiers)

In an embodiment, the composition can include surfactants (emulsifiers) to facilitate solution, emulsion, dispersion, or suspension of cosmetic components.

Surfactants can be anionic, non-ionic, cationic and/or amphoteric.

The content of surfactants is usually comprised between 1 wt. % and 30 wt. %, preferably between 2 wt. % and 20 wt. %, more preferably between 3 wt. % and 10 wt. %, and still more preferably between 4 wt. % and 8 wt. %.

Typical examples of anionic surfactants are, for example, soaps, sulfonated alkanes, sulfonated olefins, alkyl sulphates, fatty alcohol ether sulphates, glycerol ether sulphates, fatty acid ether sulphates, mono- and dialkyl sulfosuccinates, mono- and dialkyl sulfosuccinamates, ether carboxylic acids and their salts, fatty acid isethionates, fatty acid sarcosinates, fatty acid taurides, N-acylamino acids.

Typical examples of non-ionic surfactants are, for example, polyalkoxylated fatty alcohols, polyalkoxylated fatty acids, polyalkoxylated fatty acid amides, polyalkoxylated fatty amines, alkoxylated triglycerides, mixed ethers, alkylpolyglycosides, N-alkyl sorbitan esters, fatty acid esters polyethoxylated sorbitan, and amine oxides.

Typical examples of cationic surfactants are, for example, quaternary ammonium compounds, and quaternized salts of esters of trialkanolamines and fatty acids, for example Esterquats.

Typical examples of amphoteric surfactants are, for example, alkylbetaines, alkylamidobetaines, aminopropionates, aminoglycinates, imidazolinium betaines and sulfobetaines.

The aforementioned surfactants are exclusively known compounds, the structure and preparation of which are well known to those skilled in the art, and can be found, for example, in X Domingo's book, A guide to the surfactants world, Proa. Barcelona, 1995.

Lipid Components and Emollients

The composition usually contains additional lipid compounds and emollients to optimize their organoleptic and dermatological properties.

The lipid and emollient compounds are usually contained in a total amount of between 1 wt. % and 50 wt. %, preferably between 5 wt. % and 25 wt. %, and more preferably between 5 wt. % and 15 wt. %.

Suitable lipid compounds are Guerbet alcohols based on fatty alcohols with 6 to 18 carbon atoms, preferably with 8 to 10 carbon atoms (such as the product Eutanol® G from the BASF company), linear fatty acid esters $C_{6-22}$ with linear $C_{6-22}$ alcohols, $C_{6-13}$ branched carboxylic acid esters with $C_{6-22}$ linear alcohols, such as myristyl myristate, myristyl palmitate, myristyl stearate, behenyl stearate, behenyl isostearate, behenyl oleate, behenyl behenate, behenyl erucate, or erucyl myristate.

Furthermore, $C_{6-22}$ linear fatty acid esters with branched alcohols are suitable, especially 2-ethylhexanol (for example the product Cetiol® 868 from the BASF company), and isopropyl myristate; $C_{18-38}$ alkylhydroxycarboxylic acid esters with linear or branched $C_{6-22}$ fatty alcohols; linear and/or branched fatty acid esters with polyhydric alcohols, and/or Guerbet alcohols; triglycerides based on fatty acids with 6 to 10 carbon atoms (for example the product Mirytol® 318 from the company BASF); liquid mixtures of mono/di/triglycerides based on fatty acids with 6 to 18 carbon atoms; esters of fatty alcohols with 6 to 22 carbon atoms, and/or Guerbet alcohols with aromatic carboxylic acids, especially benzoic acid; esters of dicarboxylic acids with 2 to 12 carbon atoms with linear or branched alcohols of 1 to 22 carbon atoms, or polyols with 2 to 10 carbon atoms and 2 to 6 hydroxyl groups; vegetable oils; branched primary alcohols; substituted cyclohexanes: linear and branched $C_{6-22}$ fatty alcohol carbonates, such as, for example, dicaprylyl carbonates (for example the product Cetiol® CC from the BASF company); symmetric or asymmetric linear or branched dialkyl ethers with 6 to 22 carbon atoms per alkyl group, such as dicaprylyl ethers (for example the product Cetiol® OE from the BASF company); aliphatic or naphthenic hydrocarbons, such as squalane, squalene or dialkylcyclohexanes, and mixtures thereof.

Consistency Factors and Thickeners

Consistency factors and thickeners are generally used in the composition to adjust the viscosity and rheological behaviour.

Among the consistency factors that come into consideration are, firstly, fatty alcohols with a chain of 12 to 22 carbon atoms, and preferably of 16 to 18 carbon atoms, and furthermore partial glycerides, fatty acids or hydroxylated fatty acids.

Suitable thickening agents are, for example, hydrophilic silicic anhydride (such as the Aerosil® products from the Evonik company); polysaccharides, especially xanthan gum, guar gum, agar-agar, alginates and tyloses, carboxymethylcellulose and hydroxyethylcellulose, as well as polyethylene glycol mono- and higher molecular weight fatty acid diesters; polyacrylates (for example Carbopol® and Pemulen® types from the Lubrizol company; Synthalene® from the Sigma company, Keltrol® types from the CP Kelco company; Sepigel® and Simulgel® types from the Seppic company; Salcare® types from the company Allied Colloids company), polyacrylamides, polyvinyl alcohol, and polyvinylpyrrolidone.

Hydrotropes

In order to improve the flowability of the composition, it is also possible to use hydrotropes, such as, for example, ethanol, isopropyl alcohol, or polyols. The polyols which come into consideration here preferably have from 2 to 15 carbon atoms and at least two hydroxyl groups. The polyols can also contain other functional groups, especially amino groups, or be modified with nitrogen. Typical examples are glycerol; alkylene glycols, such as, for example, ethylene glycol, diethylene glycol, propylene glycol, butylene glycol, hexylene glycol, as well as polyethylene glycols with an average molecular weight of 100 to 1,000 daltons; technical oligoglycerol mixtures with a degree of self-condensation of 1.5 to 10, for example technical diglycerol mixtures with a diglycerol content of 40 wt. % to 50 wt. %; methylol compounds, such as especially trimethylolmethane, trimethylolpropane, trimethylolbutane, pentaerythritol and dipentaerythritol; alkylglycosides with a chain of 1 to 8 carbon atoms in the alkyl moiety; $C_{5-12}$ sugar alcohols, such as sorbitol or mannitol; sugars with 5 to 12 carbon atoms, such as glucose or sucrose: amino sugars, such as glucamine; dialcoholamines, such as diethanolamine or 2-amino-1,3-propanediol.

In an embodiment, glycerol, propylene glycol, and their mixtures are used as hydrotrope in the composition.

Preservative Agents

Suitable preservatives to be used in the composition include, by way of example, phenoxyethanol, 3-(4-chlorophenoxy)-1,2-propanediol (chlorphenesin), pentanediol or sorbic acid, and the classes of additional substances indicated in Annex V of the Regulation (EC) No 1223/2009 of the European Parliament and of the Council.

A composition comprising the slow-release formulation of the invention and a cosmetic ingredient, such as a film forming polymer, e.g., a combination of polyvinylacetate and polyvinylpyrrolidone, and an oil, e.g., isopropyl myristate, provides a far longer repellent effect in comparison to a commercial product (see Example 11).

In an embodiment, the composition comprises a further insect repellent compound, which is selected from essential oils, natural insect repellents, synthetic repellents, and mixtures thereof.

A further insect repellent compound is selected from, for example, DEET (N,N-diethyl-meta-toluamide), icaridin (picaridin), DEPA (N,N-diethyl phenylacetamide), IR3535, N-butyl-acetanilide, MGK Repellent 264, N-Methylneodecanamide, Al3-35765, Al3-37220 (SS220), MGK Repellent 326, geraniol, thymol, eugenol, carvacrol, vanillin, limonene, nootkatone, spathulenol, dibutyl phthalate (DBP), dimethyl phthalate (DMP), dimethyl carbonate (DMC), dioctyl phthalate, benzyl benzoate, indalone, nepetalactone, methyl anthranilate, ethyl anthranilate, cyclohexane propionic acid, nonanoic acid, 2-ethylhexanoic acid, undecylenic acid, lactic acid, diol, 2-butyl-2-ethyl-1,3-propandiol, Rutgers 612, a pyrethroid, a carbamate, and mixtures thereof. The chemical structures of some insect repellent compounds are shown in shown in FIGS. 2.1 and 2.2. Preferably the composition comprises a further insect repellent compound selected from geraniol, nootkatone, neem oil, DEET, icaridin, IR3535, and mixtures thereof.

Process for Isolating cis/trans-PMD

Another aspect of the invention is a process for isolating racemic cis/trans-PMD from an extract containing PMD.

The process comprises:
1) adding a salt selected from calcium chloride, magnesium chloride, and mixtures thereof, to a solution of an extract containing PMD,
2) separating the solid obtained in step 1), and
3) isolating racemic cis/trans-PMD from the solid separated in step 2).

In a preferred embodiment, the process comprises:
a) dissolving the extract in a solvent, preferably a mixture of a $C_5$-$C_{12}$ hydrocarbon and an aliphatic alcohol; preferably the aliphatic alcohol is selected from methanol, ethanol, n-propanol, i-propanol, n-butanol, i-butanol, sec-butanol, n-pentanol, i-pentanol, amyl alcohol, neopentyl alcohol, sec-amyl alcohol, 3-pentanol, methyl isopropyl carbinol, and 2-methyl-2 butanol; more preferably the solvent is a mixture of hexanes and ethanol,
b) adding a salt selected from calcium chloride, magnesium chloride, and mixtures thereof,
e) stirring the mixture obtained in step b) at room temperature,
d) separating the solid obtained after the stirring of step c),
e) dissolving the solid obtained in step d) in a mixture of water and a water immiscible solvent; preferably the water immiscible solvent is selected from hexane, cyclohexane, dichloromethane, 1,2-dicholoethane, chloroform, diethyl ether, t-butylmethyl ether, ethyl acetate, benzene, toluene, xylenes, 1-butanol, 2-butanol, n-pentanol, i-pentanol, amyl alcohol, neopentyl alcohol, sec-amyl alcohol, 3-pentanol, methyl isopropyl carbinol, and 2-methyl-2 butanol; more preferably the water immiscible solvent is hexane,
f) separating the hexane phase from step e), and
g) drying and removing the hexane by distillation.

In an embodiment, the aliphatic alcohol in step a) is present in a catalytic amount, for example, between 0.01 and 0.1%, preferably between 0.02 and 0.07%, more preferably about 0.05%, expressed in (v/v) over the total volume of the solvent.

The process allows the isolation of racemic cis/trans-PMD from an extract containing PMD in a practically quantitative recovery of the PMD contained in the extract.

In an embodiment the extract containing PMD is the commercially available product Citriodiol®.

In the following examples, the preparation of the compounds of the invention, and experiments related to the performance testing of the slow-release formulation are shown.

EXAMPLES $^1$H- and $^{13}$C NMR spectra were obtained on a Varian Mercury 400 (400.1 Mz for $^1$H and 100.6 MHz for $^{13}$C) in deuterated chloroform, deuterated water or deuterated dimethylsulfoxide. High resolution mass spectra (HRMS) were acquired using an LC/MSD-TOF Mass Spectrometry Instrument (Agilent Technologies).

Reaction courses and product mixtures were monitored by thin-layer chromatography (TLC) on commercial silica gel 60 plates or by ¹H NMR using the above instruments. For chromatography, column grade silica gel (0.040-0.063 mm mesh size) was employed.

Racemic cis/trans-PMD of about 95% purity was purchased from Boc Sciences and either used without further treatment or the cis- and trans-isomers (about a 6:4 mixture) separated by column chromatography over silica using 1:3 ethyl acetate/hexane. The faster running cis-isomer was identical by ¹H-NMR to authentic (1S,2R,5R)-2-(1-hydroxy-1-methylethyl)-5-methylcyclohexanol purchased from Sigma-Aldrich (Merck).

Terms "cis/trans-PMD", "cis-PMD" and "trans-PMD" in the examples refer respectively to "racemic cis/trans-PMD", "racemic cis-PMD" and "racemic trans-PMD", unless otherwise stated.

Citriodiol®, comprising about 70 wt. % of a mixture of racemic cis- and racemic trans-PMD, showing a ratio of racemic cis-PMD/racemic trans-PMD of about 1.9:1, was a gift from Citrefine Ltd.

Glucovanillin was either purchased from Carbosynth Ltd or produced in-house using standard literature procedures.

All other chemicals were purchased from Sigma-Aldrich (Merck) or from various commercial sources through Cymit Quimica.

Hemotek membrane, a thin collagen membrane, was purchased from Hemotek Ltd. (UK).

Incubation took place at 32° C. in a standard device.

Example 1: Preparation of Racemic cis-PMD Glucovanillin Conjugate

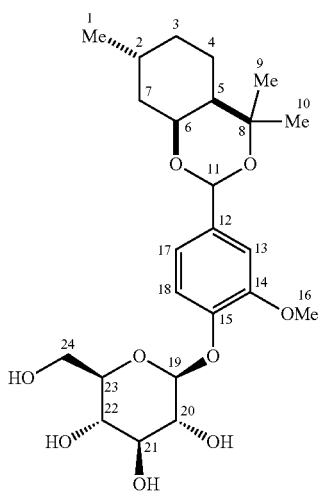

A mixture of glucovanillin (1.03 g, 3.2 mmol), racemic cis-para-menthane-3,8-diol (2.04 g, 11.9 mmol) and citric acid monohydrate (0.24 g, 1.2 mmol) was suspended in acetonitrile (10 mL) and stirred at 50° C. for 21 h.

The resultant solution was concentrated by distillation under reduced pressure and purified by chromatography over silica by gradient elution using 1:1 EtOAc/hexane to remove residual diol followed by 1:10 MeOH/dichloromethane to afford the title compound as an odourless white solid (1.42 g, 92%).

Mass spectrometry, ¹H-NMR and ¹³C-NMR were used to characterize the compound.

Example 2: Preparation of Racemic trans-PMD Glucovanillin Conjugate

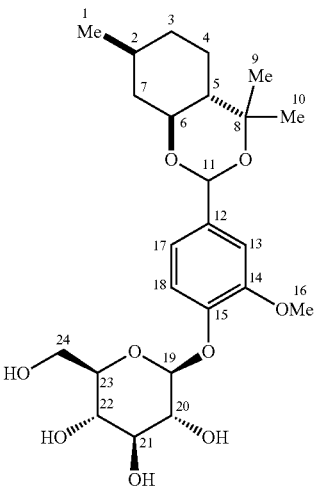

A mixture of glucovanillin (0.5 g, 1.6 mmol), racemic trans-para-menthane-3,8-diol (1.0 g, 5.8 mmol) and citric acid monohydrate (0.1 g, 0.52 mmol) was suspended in acetonitrile (2 mL) and stirred at 50° C. for 22 h.

The resultant solution was cooled to room temperature and purified by chromatography over silica by gradient elution using 1:1 EtOAc/hexane to remove residual diol followed by 1:10 MeOH/dichloromethane to afford the title compound as an odourless white solid (0.73 g, 74%). The solid (50 mg) was found to readily dissolve in water (0.1 ml).

Mass spectrometry, ¹H-NMR and ¹³C-NMR were used to characterize the compound.

Example 3: General Procedure for the Preparation of Racemic cis/trans-PMD Glucovanillin Conjugate From Citriodiol®

Citriodiol® is a commercially available product comprising about 70 wt. % of a mixture of racemic-cis- and racemic-trans-PMD, showing a ratio of racemic cis-PMD/racemic trans-PMD of about 1.9:1.

A mixture of glucovanillin, Citriodiol® and Dowex® 50WX8, sulfonic acid resin, was suspended in ethanol and stirred at 50° C. for 23 h. The resultant solution was cooled to room temperature, filtered to give PMD glucovanillin acetal crude reaction mixture as filtrate. The residue was washed with ethanol (2×1 mL) and the filtrates combined to give a pale yellow solution.

An aliquot of the solution was taken and the solvent removed by distillation under reduced pressure to give PMD glucovanillin acetal crude reaction concentrate. Upon integration of the signals of C11 according to the numbering system shown above (95.6 ppm for cis-PMD acetal vs. the sum of the signals at 94.8 ppm and 94.9 ppm for the trans-PMD acetal) of the ¹³C-NMR spectrum of the residue in CDCl₃, the ratio of cis/trans-acetals was found to be 1:2.6. This material was then concentrated by distillation under reduced pressure and the residue purified by chromatography over silica by gradient elution using 1:1 EtOAc/hexane to remove residual diol followed by 1:10 MeOH/dichloromethane to afford the title compound as a glassy solid.

Materials used in subsequent Examples 5, 6, 9 and 10 were prepared according to this general procedure, but from different batches using different Citriodiol®/glucovanillin ratios, as shown in Table I:

TABLE I

| | Example | | | |
|---|---|---|---|---|
| Component | 3 | 5 | 6 | 9 and 10 |
| Glucovanillin (mg) | 200 | 1900 | 600 | 600 |
| Citriodiol ® (mg) | 580 | 2000 | 2000 | 2000 |
| Dowex ® 50WX8 (mg) | 40 | 400 | 316 | 240 |
| Ethanol (mL) | 2 | 15 | 6 | 6 |
| Isolated yield (%) | 55 | N/A | N/A | N/A |

N/A: Material was not isolated, only PMD/acetal ratios were determined

Example 4: Measurement by $^1$H-NMR of PMD Loss from Paper Discs Containing an Isomeric Mixture of Racemic cis/trans-PMD and trans-PMD Glucovanillin Acetal with Differing Quantities of Citric Acid and Calcium Chloride To measure the PMD loss from paper discs containing an isomeric mixture of cis/trans-PMD and trans-PMD-glucovanillin acetal (from now on: trans-acetal) with differing quantities of citric acid and calcium chloride, the following mixtures were prepared as shown in Table II:

TABLE II

| Experiment Nr. | Stock Solution 1 (µL) | Stock Solution 2 (µL) | Stock Solution 3 (µL) | Stock Solution 4 (µL) | D$_2$O (µL) | MeOH-D$_4$ (µL) |
|---|---|---|---|---|---|---|
| 4.1 | 80 | 0 | 80 | 50 | 0 | 0 |
| 4.2 | 80 | 0 | 80 | 0 | 50 | 0 |
| 4.3 | 0 | 160 | 0 | 0 | 50 | 0 |
| 4.4 | 0 | 160 | 0 | 0 | 0 | 50 |

The stock solutions used in the above mixtures contained the following components:
Stock Solution 1: 200 mg of cis/trans-PMD and 130 mg of pure trans-PMD glucovanillin acetal in 0.5 mL of MeOH-d$_4$.
Stock Solution 2: 200 µL of Stock Solution 1 diluted with 200 µL of MeOH-d$_4$.
Stock Solution 3: 400 mg of citric acid in 1 mL of MeOH-d$_4$.
Stock Solution 4: 0.7 g of anhydrous calcium chloride was dissolved in 1 mL of deuterium oxide.

The stock solutions were added to glass vials in the order and quantities shown in the above Table I.

After thorough mixing, 50 µL of each mixture was added dropwise over the entire surface of parallel 5 cm diameter paper towel discs which were subsequently incubated at 32° C.

Approximately a quarter of each paper disc was cut off after 2 h and 18.5 h, rinsed with DMSO-d$_6$ (0.9 mL) and analysed by $^1$H-NMR. A further quarter of the paper treated with mixture from Experiment Nr. 2 was treated and analysed in the same way after 90.5 h. The ratio of cis-PMD/trans-acetal was determined by comparison of the integrals of their methyl protons from the $^1$H-NMR spectra at 1.17 and 1.26 ppm respectively.

A small amount of cis/trans-acetal isomerisation was observed in Experiment 4.1 and so the cis-PMD and trans-PMD ratios were determined relative to the combined acetal integrals at 1.41 and 1.26 ppm. Results found at different time points are shown in Table III below:

TABLE III

| Experiment Nr. | cis-PMD/Total-acetal ratio Time | | | trans-PMD/Total-acetal ratio Time | | |
|---|---|---|---|---|---|---|
| | 2 h | 18.5 h | 90.5 h | 2 h | 18.5 h | 90.5 h |
| 4.1 | 2.72 | 2.25 | 0.96 | 1.99 | 2.00 | 1.02 |
| 4.2 | 1.58 | 0.52 | NR | 1.34 | 0.57 | NR |
| 4.3 | 1.92 | 1.09 | NR | 1.68 | 1.11 | NR |
| 4.4 | 1.78 | 0.64 | NR | 1.51 | 0.58 | NR |

NR = not run

Results from Experiment 4.1 (cis/trans-PMD, trans-PMD glucovanillin acetal, citric acid and calcium chloride) show clearly that both cis-PMD and trans-PMD were lost at a far slower rate from a mixture of PMD isomers and trans-acetal (0.27 eq. relative to total PMD) in the presence of citric acid (1 eq. relative to total PMD) and calcium chloride (1.7 eq. relative to total PMD) than in their absence (Experiments 4.2, 4.3 and 4.4).

In all subsequent examples, where a cis- and trans-PMD mixture were used (e.g., Citriodiol®), only the cis-PMD loss has been analysed because the $^1$H-NMR peaks are easier to analyse due to less peak overlap. However, in all cases, ratios of the PMD isomers are quantitatively similar (i.e., both PMD isomers are approximately retained to a similar extent as demonstrated in this example).

Example 5: Measurement by $^1$H-NMR of PMD Loss From Paper Discs or Hemotek Membrane Containing an Isomeric Mixture of cis/trans-PMD and Pure trans-PMD Glucovanillin Acetal (trans-Acetal) or PMD Glucovanillin Acetal Crude Reaction Concentrate in Ethanol and Water To measure the PMD loss from paper discs or Hemotek membrane containing an isomeric mixture of cis- and trans-PMD and trans-PMD glucovanillin acetal in ethanol and water, in the presence and absence of citric acid and calcium chloride, the following mixtures were prepared as shown in Table IV:

TABLE IV

| Exp. Nr. | Stock Solution 1 (µL) | Stock Solution 2 (µL) | Stock Solution 3 (µL) | Stock Solution 4 (µL) | D$_2$O (µL) | EtOH (µL) | Surface |
|---|---|---|---|---|---|---|---|
| 5.1 | 80 | 80 | 50 | 0 | 0 | 0 | Paper |
| 5.2 | 80 | 80 | 50 | 0 | 0 | 0 | Hemotek |
| 5.3 | 0 | 80 | 50 | 80 | 0 | 0 | Paper |
| 5.4 | 0 | 0 | 0 | 80 | 50 | 80 | Paper |

Note that Experiment Nr. 5.1 is a repeat to Experiment Nr. 4.1 from Example 4, but using ethanol rather than MeOH-D$_4$.

The following stock solutions were prepared:
Stock Solution 1: 400 mg of cis/trans-PMD and 260 mg of trans-PMD glucovanillin acetal in absolute ethanol (1 mL).
Stock Solution 2: 400 mg of citric acid in 1 mL of absolute ethanol.
Stock Solution 3: 0.7 g of anhydrous calcium chloride dissolved in 1 mL of deuterium oxide.
Stock Solution 4: 200 mg of the PMD glucovanillin acetal crude reaction concentrate from Example 3 dissolved in 200 µL of absolute ethanol.

The stock solutions were added to glass vials in the order and quantities shown in the above table to give clear colourless solutions after thorough mixing except for Experiment Nr. 5.3 which was a pale purple solution.

50 μL of each mixture was added dropwise over the entire surface of parallel 5 cm diameter paper towel discs or Hemotek membrane, as indicated in the above table and subsequently incubated at 32° C.

Approximately a half of each disc was cut off after 17.5 h. rinsed with DMSO-$d_6$ (0.9 mL) and analysed by $^1$H-NMR. In experiments 3 and 4, where the starting mixtures were in equilibrium, the ratio of cis-PMD/trans-acetal was determined by comparison of the integrals of their methyl protons from the $^1$H-NMR spectra at 1.17 and 1.26 ppm respectively. In experiments 1 and 2, some cis/trans-acetal isomerisation occurred and so the cis-PMD/Total-acetal ratios were determined from the integral of the signal ppm at 1.17 and the combined integrals of the signals at 1.41 and 1.26 ppm.

Stock solution 1 gave a cis-PMD/acetal ratio of 3.07 by $^1$H-NMR which was taken as the time zero ratio for Experiments Nr. 1 and 2.

Stock solution 4 gave a cis-PMD/acetal ratio of 1.17 by $^1$H-NMR which was taken as the time zero ratio for Reactions 3 and 4.

Table V show the results obtained in this example:

TABLE V

| | Cis-PMD/acetal ratio Time | |
|---|---|---|
| Experiment Nr. | 0 h | 17.5 h |
| 5.1 | 3.07 | 2.25 |
| 5.2 | 3.07 | 2.72 |
| 5.3 | 1.17 | 1.18 |
| 5.4 | 1.17 | 0.85 |

It can be observed that:
- cis-PMD loss from Experiment Nr. 5.1 was comparable to that of Experiment Nr. 4.1 from Example 4 demonstrating that the results are reproducible.
- cis-PMD loss from paper (Experiment Nr. 5.1) and Hemotek membrane (Experiment Nr. 5.2) were very similar demonstrating that the effect is independent of surface type.
- cis-PMD loss from the Citriodiol®/trans-acetal mixture in the presence of citric acid and calcium chloride (Experiment Nr. 5.3) was substantially lower than in their absence (Experiment Nr. 5.4).

Example 6: Measurement of Loss of PMD from PMD Glucovanillin Acetal Crude Reaction Mixture Using Different Citric Acid and Calcium Chloride Loadings on Paper To measure the PMD loss from paper discs containing cis-PMD and trans-PMD glucovanillin acetal by $^1$H-NMR using different citric acid and calcium chloride loading, as shown in Table VI, the following compositions were prepared:

TABLE VI

| Formulations | Citric acid H$_2$O (mg) | CaCl$_2$ in water 0.7:1 (w/v) (μL) | cis-PMD/trans-acetal ratio 20.5 h | % cis-PMD remaining |
|---|---|---|---|---|
| 6.1 | 24 | 50 | 1.18[1] | 11.6 |
| 6.2 (comparative) | 0 | 0 | 0.89[1] | 8.7 |
| 6.3 | 36 | 75 | 1.80[2] | 17.7 |
| 6.4 | 48 | 100 | 3.48[2] | 34.2 |
| 6.5 | 72 | 150 | 5.23[2] | 51.4 |
| 6.6 | 72 | 50 | 3.60[3] | 35.4 |
| 6.7 | 24 | 150 | 1.60[3] | 15.7 |

[1]Time: 20.5 h;
[2]Time: 19 h;
[3]Time: 21 h

The compositions were prepared by mixing 1 mL of Stock Solution 1, containing PMD glucovanillin acetal crude reaction mixture prepared as shown in Example 3, with amounts of citric acid and calcium chloride, as disclosed in Table VI.

50 μL of each mixture was added dropwise over the entire surface of parallel 5 cm diameter paper towel discs, as indicated in the above table and subsequently incubated at 32° C.

Approximately a quarter of each disc was cut off at the indicated time points, rinsed with DMSO-$d_6$ (0.9 mL) and analysed by $^1$H-NMR. The ratio of cis-PMD/trans-acetal was determined by comparison of the integrals of their methyl protons from the $^1$H-NMR spectra at 1.17 and 1.26 ppm respectively.

Stock solution 1 gave a cis-PMD/trans-acetal ratio of 10.18 by $^1$H-NMR which was taken as the time zero ratio. The % cis-PMD remaining was calculated using the value at 20.5 h taking into account said value at time zero.

This experiment demonstrates that the combination of citric acid and calcium chloride provide a slow PMD loss effect.

Example 7: Measurement of PMD Loss from Paper Discs Containing an Isomeric Mixture of cis/trans-PMD, Citric Acid, Calcium Chloride and Different Glucopyranosides To measure the PMD loss from paper discs containing an isomeric mixture of cis/trans-PMD, citric acid, calcium chloride and different glucopyranosides, the mixtures shown in Table VII were prepared:

TABLE VII

| Exp. Nr. | Glucopyranoside | Amount of glucopyranoside (mg) | Stock Solution 1 (μL) | Stock Solution 2 (μL) | Stock Solution 3 (μL) |
|---|---|---|---|---|---|
| 7.1 | trans-acetal | 20 | 110 | 80 | 50 |
| 7.2 | Geranyl-β-glucopyranoside | 20 | 110 | 80 | 50 |
| 7.3 | 0 | 0 | 110 | 80 | 50 |
| 7.4 | Phenyl-β-glucopyranoside | 20 | 110 | 80 | 50 |
| 7.5 | Methyl-α-glucopyranoside | 20 | 110 | 80 | 50 |
| 7.6 | trans-acetal | 10 | 110 | 80 | 50 |

The following stock solutions were prepared:
Stock Solution 1: 300 mg of cis/trans-PMD dissolved in 0.8 mL of MeOH-$d_4$.
Stock Solution 2: 400 mg of citric acid dissolved in 1 mL of MeOH-$d_4$.

Stock Solution 3: 0.7 g of anhydrous calcium chloride dissolved in 1 mL of deuterium oxide.

Glucopyranosides (20 mg) shown in the above table were weighed out into parallel glass vials and the stock solutions added where shown and in quantities shown in Table VII.

After thorough mixing, 50 μL of each mixture was added dropwise over the entire surface of parallel 5 cm diameter paper towel discs which were subsequently incubated at 32° C.

Approximately a quarter of each paper disc was cut off after 3 h and 21 h, rinsed with DMSO-$d_6$ (0.9 mL) and analysed by $^1$H-NMR.

The ratio of cis-PMD/glucopyranoside was determined by using the following signals from the $^1$H-NMR spectrum:

Experiment 7.1: Some of the trans-acetal was observed to have converted to the cis-acetal due to equilibration with the cis/trans-PMD in solution prior to addition to paper. By comparison of the signals at 5.70 and 6.68 ppm, it was observed that the ratio of trans-acetal/cis-acetal did not significantly alter once on the paper surface. Therefore, the ratio of cis-PMD/Total-acetal was determined by comparison of the integrals of the signals from the $^1$H-NMR spectra of the cis-PMD at 4.15 ppm and the combined acetal signals at 5.70 and 5.68 ppm.

Experiment 7.2: Peaks at 4.15/5.08 ppm

Experiment 7.3: Peaks at 4.15/harmonic of solvent peak at 1.17 ppm.

Experiment 7.4: Peaks at 4.15/4.84 ppm

Experiment 7.5: Peaks at 4.15/4.90 ppm

Experiment 7.6: As for Experiment 7.1

The difference in ratio was then used to determine the extent of PMD loss, which is shown in Table VIII:

TABLE VIII

| Exp. Nr./ | cis-PMD/glucopyranoside ratio | | cis-PMD loss over 18 h period |
|---|---|---|---|
| Time | 3 h | 21 h | (%) |
| 7.1 | 1.88 | 1.56 | 17 |
| 7.2 | 1.30 | 0.73 | 44 |
| 7.3 | 5.9 | 0.15 | 97 |
| 7.4 | 0.68 | 0.71 | −4 |
| 7.5 | 0.52 | 0.40 | 23 |
| 7.6 | 4.54 | 2.70 | 41 |

It can be clearly seen that cis-PMD is lost from paper at a significantly slower rate using different glucopyranosides in the presence of citric acid and calcium chloride than when no glucoside is present. Also, it can be observed that all glucosides tested have a positive effect on the retention of PMD loss.

Example 8: Measurement of PMD Loss from a Mixture of cis-PMD, Methyl-α-Glucopyranoside, Citric Acid, and Calcium Chloride Compared to a Mixture of cis-PMD and Methyl-α-Glucopyranoside Added to Paper at Different Loadings To measure the PMD loss from mixtures of cis-PMD and methyl-α-glucoside, both in the presence and in the absence of the combination of citric acid and calcium chloride, stock solutions were prepared by mixing the materials in quantities shown in Table IX, followed by gentle heating with a heat gun:

TABLE IX

| Stock Solution | cis-PMD (g) | Methyl-α-glucoside (g) | Citric acid·$H_2O$ (g) | $CaCl_2$ in water 0.7:1 (w/V) (mL) | EtOH (mL) | $H_2O$ (mL) |
|---|---|---|---|---|---|---|
| 1 | 0.3 | 0.22 | 0 | 0 | 4 | 0.3 |
| 2 | 0.3 | 0.22 | 0.22 | 0.2 | 3.3 | 0.3 |

50 μL of each stock solution was added dropwise over the entire surface of parallel 5 cm diameter paper towel discs and subsequently incubated at 32° C.

Approximately a quarter of each disc was cut off after 19 h and rinsed with DMSO-$d_6$ (0.9 mL). Two drops of deuterium oxide were added to each sample which was subsequently analysed by $^1$H-NMR. The ratio of cis-PMD/methyl-α-glucopyranoside was determined by comparison of the integrals of their protons from the $^1$H-NMR spectra at 4.15/4.90 ppm respectively. Data obtained for Stock Solutions 1 and 2 are reported in Table X below as Experiment Nr. 8.1 and 8.4 respectively.

Time zero data were obtained by analysis of the stock solutions as above.

Subsequent experiments were run by the dropwise loading 0.25 and 0.5 mL of Stock Solutions 1 and 2 onto parallel papers in the same way as shown above. Data taken at times 22.5 and 45 h are also reported in Table X below:

TABLE X

| Exp No. | | cis-PMD/methyl-α-glucopyranoside ratio Time | | | | % cis-PMD Remaining on Paper | | |
|---|---|---|---|---|---|---|---|---|
| | | 0 h | 19 h | 22.5 h | 45 h | 19 h | 22.5 h | 45 h |
| 8.1 | Stock sol. 1 (50 μL) (comparative) | 1.54 | 0.28 | NR | NR | 18.2 | ND | ND |
| 8.2 | Stock sol. 1 (0.25 mL) (comparative) | 1.54 | NR | 0.66 | 0.12 | ND | 42.9 | 7.8 |
| 8.3 | Stock sol. 1 (0.5 mL) (comparative) | 1.54 | NR | 1.08 | 0.28 | ND | 70.1 | 18.2 |
| 8.4 | Stock sol. 2 (50 μL) | 1.54 | 0.51 | NR | NR | 33.1 | NC | ND |
| 8.5 | Stock sol. 2 (0.25 mL) | 1.54 | NR | 1.08 | 0.36 | ND | 70.1 | 23.4 |

TABLE X-continued

| Exp No. | | cis-PMD/methyl-α-glucopyranoside ratio Time | | | | % cis-PMD Remaining on Paper | | |
|---|---|---|---|---|---|---|---|---|
| | | 0 h | 19 h | 22.5 h | 45 h | 19 h | 22.5 h | 45 h |
| 8.6 | Stock sol. 2 (0.5 ml) | 1.64 | NR | 1.22 | 0.54 | ND | 79.2 | 35.1 |

NR = not run
ND = not determined

The data clearly demonstrate that significantly more PMD remains on the paper in the presence of methyl-α-glucopyranoside citric acid and calcium chloride than in the presence of methyl-α-glucopyranoside alone at different concentrations of mixture applied.

Example 9 Effect of Alternative Acids on PMD Loss from Paper

To measure the effect of alternative acids on PMD loss from paper, 50 μL of anhydrous calcium chloride/water solution 0.7:1 (w/V) were added to 0.5 mL of PMD glucovanillin acetal crude reaction mixture prepared as shown in Example 3.

To 0.1 mL aliquots of the above mixture were added 10 mg quantities of p-toluene sulfonic acid, and tartaric acid to afford mixtures 1, and 2 respectively.

All of each mixture was applied to three parallel 5 cm diameter paper towel discs which were then incubated at 32° C.

Approximately a quarter of each disc was cut off after 27 h, rinsed with DMSO-$d_6$ (0.9 mL) and analysed by $^1$H-NMR. The ratio of cis-PMD/cis-acetal was determined by comparison of the integrals of their methyl protons from the $^1$H-NMR spectra at 1.17 and 1.26 ppm respectively.

Time zero ratio was determined by integration of the same peaks of the PMD glucovanillin acetal crude reaction mixture.

Results are shown in Table XI:

TABLE XI

| Experiment Nr./ | cis-PMD/trans-acetal ratio | |
|---|---|---|
| Time | 0 h | 27 h |
| 9.1 | 11.3 | 9.85 |
| 9.2 | 11.3 | 3.32 |

A low level of cis-PMD loss was observed in the presence of p-toluene sulfonic acid and tartaric acid.

Therefore, diacids and acids of widely differing pKa can be used to provide the same slow-release effect.

Example 10: Measurement of cis-PMD Loss from PMD Glucovanillin Acetal Crude Reaction Mixture, Applied on Skin Both in the Presence and in the Absence of a Polymer To measure the PMD loss from cis-PMD applied on skin both in the presence and in the absence of a polymer such as Kollicoat® SR 30 D, the following mixtures were prepared.

Mixture 1: Citric acid monohydrate (212 mg) was dissolved in 3 mL of the PMD glucovanillin acetal crude reaction mixture prepared as shown in Example 3, and 150 uL of a 0.7:1 (w/v) anhydrous calcium chloride/water solution with gentle heating using a heat gun.

Mixture 2: Kollicoat® SR 30 D (0.2 g) and isopropyl myristate (30 mg) were diluted with 1 mL of Mixture 1 to give a viscous, slightly opaque solution following gentle heating with a heat gun.

Each mixture (50 μL) was spread over a 5 cm diameter circular area of forearm skin. The area treated with Mixture 2 was noticeably less sticky than the area treated with Mixture 1.

After 4 hours, each area was tape stripped by consecutively applying 2×2 cm×5 cm pieces of Sellotape® (Miarco Gamma Azul). The two tapes used to strip each area were then combined, rinsed with DMSO-$d_6$ (1 mL) and the resultant solution analysed by $^1$H-NMR.

The ratio of cis-PMD/cis-acetal was determined by comparison of the integrals of their methyl protons from the $^1$H-NMR spectra at 1.17 and 1.41 ppm respectively.

Results are shown in Table XII:

TABLE XII

| Mixture Nr./ | cis-PMD/cis-acetal ratio | |
|---|---|---|
| Time | 0 h | 4 h |
| 1 | 11.3 | 14.2 |
| 2 | 11.3 | 10.0 |

The ratio of cis-PMD/cis-acetal was similar demonstrating that the addition of the film forming polymer and isopropyl myristate has a positive effect on skin feel of the repellent mixture without significantly affecting the rate of PMD loss.

Example 11: In Vivo Repellent Effect—Comparative Experiments

The following series of experiments were performed on separate days, but under similar conditions. Thus, mixtures of known volumes shown in the tables below were spread over one lower leg and top of foot of a single, middle aged, male volunteer (approximate skin area calculated to be 1200 cm$^2$). The other lower leg and foot of the same volunteer remained untreated, or treated with a known volume of another mixture. The volunteer showered between experiments and treated and untreated legs were alternated.

At time periods after mixture application shown in the tables below, the volunteer stood in a location known to be populated with *A. albopictus* mosquitos (Sant Cugat del Valles, Spain). The volunteer counted the time point of each mosquito landing on each leg and after brushing them off, then moved to a slightly different location to avoid the same mosquito from landing a second time and resumed counting and moving over a 30-minute period. If more than one mosquito landed at the same time, all were counted.

Experiment A: In-Vivo Repellent Effect of Citriodiol®/methyl-α-glucopyranoside/citric acid/calcium chloride Mixture Compared to Commercial Mosiguard®

The following mixtures were tested:

Mixture 1: Mosiguard® was purchased on line through Amazon and was produced by Citrefine. The Mosiguard® contained a 30% Citriodiol® content according to the label.

Mixture 2: Citriodiol® (6.0 g), methyl-α-glucopyranoside (2.2 g) and citric acid monohydrate (2.2 g) were diluted with ethanol (14 mL) and a 0.7:1 (w/v) anhydrous calcium chloride/water solution (2.0 mL) with gentle heating using a heat gun. Kollicoat® SR 30 D (8 mL) and isopropyl myristate (1.2 mL) were added to give a viscous, slightly opaque solution. The mixture was an unstable emulsion that slowly separated into two phases after a few hours and so required thorough shaking before application.

Mixture 1 (1 mL) was applied to the left leg and Mixture 2 (2 mL) to the right leg as described above and landings over time reported in Table XIII below:

TABLE XIII

| Mixture/ | Mosquito landings observed at time following mixture application | | |
|---|---|---|---|
| Time | 9 h | 12 h | 15 h |
| 1 (comparative) | 7 | 10 | 1 |
| 2 | 0 | 0 | 4 |

No skin irritation was observed on either leg over the duration of the experiment. Significant mosquito landings were observed on the area treated with Mixture 1 after 9 h and mosquito landings on the area treated with Mixture 2 were only observed after 15 h.

Mixture 2 clearly gives at least a 3 h longer mosquito repellent effect than Mixture 1 at the doses applied.

Experiment B: In Vivo Repellent Effect of Mosiguard® at Double Prescribed Dose

The following mixture was tested:

Mixture 1: 2 mL of Mosiguard® (Citrefine) were applied to the right leg as described above and the left leg was untreated.

Landings over time reported in Table XIV below:

TABLE XIV

| Mixture/ | Mosquito landings observed at time following mixture application | | | | |
|---|---|---|---|---|---|
| Time | 2 h | 4 h | 7.5 h | 8.75 h | 9.5 h |
| 1 (comparative) | 0 | 0 | 0 | 0 | 3 |
| Untreated | 14 | 8 | 5 | 4 | 9 |

No skin irritation was observed on either leg over the duration of the experiment. Doubling the dose of Mosiguard® used compared to Experiment A only gave a duration of 9.5 h.

Experiment C: In-Vivo Repellent Effect of cis-PMD, methyl-α-glucopyranoside, Citric Acid and Calcium Chloride Mixture The following mixture was tested:

Mixture 1: cis-PMD (0.6 g), methyl-α-glucopyranoside (0.22 g) and citric acid monohydrate (0.22 g) were diluted with ethanol (1.4 mL) and a 0.7:1 (w/v) anhydrous calcium chloride/water solution (0.2 mL) with gentle heating using a heat gun. Kollicoat® SR 30 D (0.8 mL) and isopropyl myristate (0.12 mL) were added to give a viscous, slightly opaque solution. The mixture was an unstable emulsion that slowly separated into two phases after a few hours and so required thorough shaking before application. 2 mL of Mixture 1 was applied to the left leg as described above, and the right leg was untreated.

Landings over time are reported in Table XV below:

TABLE XV

| Mixture/ | Mosquito landings observed at time following mixture application | | | | |
|---|---|---|---|---|---|
| Time | 2 h | 5 h | 8 h | 10 h | 14 h |
| 1 | 0 | 1 | 0 | 0 | 0 |
| Untreated | 6 | 7 | 12 | 7 | 2 |

At the end of the experiment, when no further mosquito activity was observed, an approximately 5 cm diameter circular area of hairless skin on the treated left leg was tape stripped, treated and analysed by $^1$H-NMR as in Example 10. The exception was that 2 drops of deuterium oxide were added to the NMR sample prior to analysis. Approximately 25% of cis-PMD remained on the skin on comparison of the integrals of the cis-PMD multiplet at 4.14 ppm to the methyl-α-glucoside doublet at 4.52 ppm.

No skin irritation was observed on either leg over the duration of the experiment. This mixture produced a much lower odour on skin than the Citriodiol® mixture used in Experiment A.

Mixture 1 gave a mosquito repellent effect over at least 14 h. The remainder of 25% of the active substance suggests that an even longer duration might have been possible if the mosquito activity had not been lost.

Experiment D: In-Vivo Repellent Effect of 20% (v/v) DEET in Ethanol

The following mixture was tested:

Mixture 1: 20 mL of N,N-Diethyl-meta-toluamide (DEET) was diluted to 100 mL with ethanol. 1 mL of mixture 1 was applied to the left leg as described above and the right leg was untreated.

Landings over time are reported in Table XVI below:

TABLE XVI

| Mixture/ | Mosquito landings observed at time following mixture application | | |
|---|---|---|---|
| Time | 3 h | 5.5 h | 7.5 h |
| 1 (comparative) | 0 | 0 | 7 |
| Untreated | 7 | 14 | 19 |

It can be observed that 20% (v/v) DEET provided significantly less duration of protection than mixtures used in Experiments A and C.

Example 12: Measurement of the Loss of cis-PMD From a Mixture of cis-PMD, methyl-α-glucopyranoside, Citric Acid and Calcium Chloride on Skin A mixture was prepared as described in Example 11, Experiment C.

The mixture (50 µL) was spread over 7×5 cm diameter circular areas of forearm skin.

After various time periods, each area was tape stripped as described in Example 10, rinsed with DMSO-$d_6$ (1 mL). 2 drops of deuterium oxide added, and the resultant solutions analysed by $^1$H-NMR.

The ratio of cis-PMD/Methyl glucopyranoside was determined by comparison of the integrals of the cis-PMD multiplet at 4.14 ppm to the methyl-α-glucoside doublet at 4.52 ppm respectively and remaining cis-PMD calculated.

Table XVII shows the linearity of the loss of cis-PMD:

TABLE XVII

| | Time | | | | | |
|---|---|---|---|---|---|---|
| | 0 h | 6 h | 9 h | 12 h | 20 h | 25 h | 46.5 h |
| 9% cis-PMD remaining on skin | 100 | 38 | 85 | 77 | (126) | 54 | 23 |

Excluding the outlying result obtained after 20 hours, the loss of cis-PMD from skin is clearly demonstrated to occur in a linear fashion.

Example 13: Measurement of Loss of cis-PMD and trans-PMD from Mixtures of cis- or trans-PMD, methyl-α-glucopyranoside, Citric Acid, and Calcium Chloride on Skin Parallel mixtures were prepared as described in Example 11, Experiment C, but Mixture 1 contained cis-PMD and Mixture 2 contained trans-PMD.

Each mixture (50 µL) was spread over 2×5 cm diameter circular areas of forearm skin.

At time zero and after 6 hours, each area was tape stripped as described in Example 10, rinsed with DMSO-$d_6$ (1 mL), 2 drops of deuterium oxide added, and the resultant solutions analysed by $^1$H-NMR.

The ratio of cis-PMD/Methyl glucoside was determined by comparison of the integrals of the cis-PMD multiplet at 4.14 ppm to the methyl-α-glucoside doublet at 4.52 ppm respectively and remaining cis-PMD calculated.

The ratio of trans-PMD/Methyl glucoside was determined by comparison of the integrals of the trans-PMD methyl signal at cis 1.05 ppm (divided by 3) to the methyl-α-glucopyranoside doublet at 4.52 ppm.

Table XVIII shows the results:

TABLE XVII

| Mixture | PMD/Methyl glucoside ratio | |
|---|---|---|
| Number | 0 h | 6 h |
| 1 | 3.22 | 3.62 |
| 2 | 3.33 | 2.66 |

The integration in this example was not particularly reliable due to the short time period, but it was noteworthy in that Mixture 1 had a PMD smell on skin whereas Mixture 2 was odourless opening up the possibility to develop an odourless repellent.

Example 14: Measurement of Loss of cis-PMD From Mixtures of cis-PMD, methyl-α-glucopyranoside, Carboxylic Acid, and Calcium Chloride on Skin Parallel mixtures were prepared as described in Example 11, Experiment C, but Mixture 1 contained citric acid monohydrate and Mixture 2 contained succinic acid (both at the same weight equivalents).

Each mixture (50 µL) was spread over 3×5 cm diameter circular areas of forearm skin.

At various time points, each area was tape stripped as described in Example 10, rinsed with DMSO-$d_6$ (1 mL), 2 drops of deuterium oxide added, and the resultant solutions analysed by $^1$H-NMR.

The ratio of cis-PMD/methyl-α-glucopyranoside was determined by comparison of the integrals of the cis-PMD multiplet at 4.14 ppm to the methyl-α-glucopyranoside doublet at 4.52 ppm respectively and remaining cis-PMD calculated.

Table XIX shows the results:

TABLE XIX

| Mixture Nr./ | PMD/Glucopyranoside ratio | | |
|---|---|---|---|
| Time | 8 h | 17.5 h | 32 h |
| 1 | 2.0 | ND | 1.47 |
| 2 | 2.0 | 1.89 | 1.66 |

It can be observed that rate of PMD loss from mixtures containing citric acid and succinic acid is comparable in spite of their considerable pKa difference.

Example 15: Measurement of PMD Loss by $^1$H-NMR From Parallel Paper Discs Containing an Isomeric Mixture of Racemic cis/trans-PMD and trans-PMD Glucovanillin Acetal (trans-acetal) With Citric Acid and Various Metal Halides Parallel mixtures were prepared as shown in Table XX:

TABLE XX

| Experiment Nr. | Stock Solution 1 (µL) | Salt (5 mg) |
|---|---|---|
| 15.1 | 60 | Calcium chloride (anhydrous) |
| 15.2 | 60 | None |
| 15.3 | 60 | Magnesium chloride |
| 15.4 | 60 | Magnesium bromide |
| 15.5 | 60 | Zinc Iodide |
| 15.6 | 60 | Cobalt chloride |
| 15.7 | 60 | Zinc chloride |
| 15.8 | 60 | Zino bromide |

The following stock solution was prepared:
Stock Solution 1: 0.11 g of cis/trans-PMD, 75 mg of trans-PMD glucovanillin acetal and 90 mg of citric acid monohydrate dissolved in 0.6 mL of EtOH and 110 µL of water.

Stock solution 1 (60 uL) was added to glass vials containing different salts (5 mg) as indicated in above Table XX.

After thorough mixing and mild heating to dissolve all solids, the contents of each vial were added dropwise over the entire surface of parallel 5 cm diameter paper towel discs which were subsequently incubated at 32° C.

Approximately a quarter of each paper disc was cut off after 2 h and 20.5 h, rinsed with DMSO-$d_6$ (0.9 mL) and analysed by $^1$H-NMR.

The ratio of cis-PMD/Total-acetal was determined by comparison of the integrals of the signals from the $^1$H-NMR spectra of the cis-PMD at 4.15 ppm and the combined acetal signals at 5.70 and 5.68 ppm. Note that some acetal isomerisation was observed in some cases as in Example 7, but this did not correlate with PMD retention.

The difference in ratio between the two time points is shown in Table XXI below:

TABLE XXI

| Experiment Nr./ | cis-PMD/Total acetal ratio | | cis-PMD loss over the 18.5 h period |
|---|---|---|---|
| Time | 2 h | 20.5 h | (%) |
| 15.1 | 1.85 | 1.45 | 22 |
| 15.2 (comparative) | 1.92 | 0.60 | 69 |
| 15.3 | 2.38 | 1.79 | 25 |
| 15.4 | 2.00 | 1.14 | 43 |
| 15.5 | 1.64 | 1.25 | 24 |
| 15.6 | 2.13 | 2.00 | 6 |
| 15.7 | 2.33 | 2.17 | 7 |
| 15.8 | 2.00 | 1.66 | 17 |

All divalent metal halides tested gave a low rate of PMD loss compared to the salt-free mixture. Zinc and cobalt salts were more effective than calcium or magnesium salts. Chlorides were more effective than bromides or iodide.

Example 16: Measurement of PMD Loss by $^1$H-NMR From Parallel Paper Discs containing an Isomeric Mixture of RACEMIC cis/trans-PMD, Citric Acid, Calcium Chloride and Alternative Glycosides Parallel mixtures were prepared as shown in Table XXII:

TABLE XXII

| Experiment Nr. | Glycoside (5 mg) | Stock Solution 1 (μL) | Stock Solution 2 (μL) |
|---|---|---|---|
| 16.1 | Methyl-β-D-glucopyranoside | 60 | 0 |
| 16.2 | trans-acetal | 60 | 0 |
| 16.3 | Methyl-α-D mannopyranoside | 60 | 0 |
| 16.4 | trans-acetal | 0 | 60 |
| 16.5 | Methyl-α-D-galactopyranoside | 60 | 0 |
| 16.6 | Methyl-α-D-glucopyranoside | 60 | 0 |

The following stock solutions were prepared:
Stock Solution 1: A mixture of 0.12 g of cis/trans-PMD, 90 mg of citric acid monohydrate and 77 mg of anhydrous calcium chloride was dissolved in ethanol (0.6 mL) and deionised water (110 μL) with gentle heating using a heat gun.
Stock Solution 2: A mixture of 0.12 g of cis/trans-PMD and 90 mg of citric acid monohydrate was dissolved in ethanol (0.6 mL) and distilled water (110 μL).
Glycosides (5 mg) shown in Table XXII were weighed out into parallel glass vials, 60 μL of the Stock Solution 1 or 2 were added.

The resultant mixtures were gently heating using a heat gun to form colourless solutions and the whole of each mixture was added dropwise over the entire surface of parallel 5 cm diameter paper towel discs which were subsequently incubated at 32° C.

Approximately a quarter of each paper disc was cut off after 2.25 h and 19 h, rinsed with DMSO-$d_6$ (1 mL), 2 drops of deuterium oxide added and the samples analysed by $^1$H-NMR.

The ratio of cis-PMD/glycoside was determined from:
Experiment 16.1: Peaks at 4.65/4.02 ppm
Experiment 16.2: Due to some initial acetal isomerisation in solution prior to addition to paper as mentioned in example 7, the ratio of cis-PMD/Total-acetal was determined by comparison of the integrals of the signals from the $^1$H-NMR spectra of the cis-PMD at 4.15 ppm and the combined acetal signals at 5.70 and 5.68 ppm.
Experiment 16.3: Peaks at 4.14/4.48 ppm
Experiment 16.4: As for Experiment 16.2
Experiment 16.5: Peaks at 4.14/4.51 ppm
Experiment 16.6: Peaks at 4.14/4.50 ppm The difference in ratio was then used to determine the extent of PMD loss, as shown in Table XXIII:

TABLE XXIII

| Experiment Nr./ | cis-PMD/Glycoside ratio | | cis-PMD loss over 16.75 h period |
|---|---|---|---|
| Time | 2.25 h | 19 h | (%) |
| 16.1 | 0.62 | 0.44 | 29 |
| 16.2 | 2.17 | 1.43 | 34 |
| 16.3 | 0.71 | 0.62 | 12.7 |
| 16.4 (comparative) | 2.22 | 0.71 | 68 |
| 16.5 | 0.45 | 0.37 | 18 |
| 16.6 | 0.48 | 0.37 | 23 |

It can be clearly seen that the presence of all glycosides resulted in a retention of PMD compared to the control Experiment 16.4 (where no calcium chloride had been added).

Therefore, the PMD slow-release effect can be maintained using a broad range of glycosides displaying a variation in aglycone type (see Example 7), sugar stereochemistry (sugar type) and stereochemistry of the glycosidic linkage.

Example 17: In-Vitro Repellent Effect of Citriodiol®, methyl-α-glucopyranoside Citric Acid, and Calcium Chloride Mixture Compared to Commercial Mosiguard®

*Aedes albopictus* mosquitoes were reared and maintained at 26±2° C. temperature, ≥80%±10 relative humidity, with a 12 h:12 h (light:dark) photoperiod. Populations of adult mosquitoes were allowed to feed on sugar solution (10%), but were not blood fed before tests.

The following mixtures were prepared:
Mixture 1: Mosiguard® was purchased on line through Amazon and was produced by Citrefine and contained a 30 v/v Citriodiol® content according to the label.
Mixture 2: Citriodiol® (6.0 g), methyl-α-glucopyranoside (2.2 g) and citric acid monohydrate (2.2 g) were diluted with ethanol (14 mL) and a 0.7:1 w/v anhydrous calcium chloride/water solution (2.0 mL) with gentle heating using a heat gun. Kollicoate® SR 30 D (8 mL) and isopropyl myristate (1.2 mL) were added to give a viscous, slightly opaque solution. The mixture was an unstable emulsion that slowly separated into two phases after a few hours and so required thorough shaking before application.

60 µL of Mixture 1 was spread over each of four parallel Hemotek membranes stretched across 3.7 cm diameter metal Hemotek reservoirs containing sheep's' blood. Four further membranes were treated in the same way with 60 µL of Mixture 2. A further membrane was left untreated.

After allowing the residual solvent to dry over approximately 5 minutes, the samples were attached to Hemotek heater units at 37° C., the membrane cover reservoirs allowed to warm over 5 minutes and the membranes subsequently exposed to 5- to 7-day old active host-seeking female mosquitoes, selected and collected using an aspirator and organized into batches (15 females) in 12×20 cm plastic test containers and the number of landings recorded over a 20-minute period.

The membrane covered reservoirs where then detached from the Hemotek heating units and stored in an incubator at 32° C., periodically re-attaching them to the heated Hemotek heater units at various time intervals to determine mosquito landings against fresh batches of mosquitos as described above.

Membranes treated with Mixture 1 demonstrated a significant repellent effect compared to untreated membrane over the first four hours, but a noticeable loss of repellent activity after 6 h. In contrast, membranes treated with Mixture 2 maintained a consistent repellent activity over the 6 h test period.

It can be concluded that the mixture containing Citriodiol®, methyl-α-glucopyranoside, citric acid, and calcium chloride retained a longer duration effect than the same volume of Mosiguard® in spite of the lower Citriodiol® content of the former.

Example 18: In Vivo Repellent Effect Test

In this example it was performed a comparison of the repellent effect of Citriodiol®, methyl-α-glucopyranoside, citric acid, and calcium chloride mixture to commercial Mosiguard® by in vivo arm-in-cage testing using *Aedes albopictus* mosquitoes.

The ECHA (European Chemical Agency) procedures (last update March 2022) were employed to design trials to test repellents against mosquitoes. The evaluation of repellent activity was carried out under controlled climatic conditions in a chamber volume of about 78 $m^3$. All tests were undertaken with non-blood fed females of Asian tiger mosquito, 5-10 days-old. Insects were reared under laboratory conditions: temperature of 25±2° C., relative humidity of 60±5%, and photoperiod of 12:12 h (L:D). They were given sugar water (5%) prior and during the testing period to promote their good shape. The work was conducted with 4 participants (2 males and 2 females, aged 19-54 years). All of them signed a written informed consent form explaining the purpose and procedures of the study as well as their role in the study. Participants were asked to avoid the use of fragrances, nicotine, alcohol and repellents 12 h prior to the test. Before the application of the repellent, the skin to be exposed was washed with unscented soap, rinsed with water, rinsed with ethanol 70% and then dried with a towel. A conventional AIC (arm in cage) test (WHO, 2009 and EPA, 2010) was performed. Eight cages (2 per participant) of 30×30×30 cm were prepared 24 h before the test with a density of about 38 mosquitoes.

The following mixtures were prepared.

Mixture 1: Mosiguard® was purchased on line through Amazon and was produced by Citrefine and contained a 30 v/v Citriodiol® content according to the label.

Mixture 2: Citriodiol® (3.0 g), methyl-α-glucopyranoside (0.19 g) and succinic acid (2.2 g) and anhydrous magnesium chloride (0.07 g) were diluted with absolute ethanol (3.00 g), Kollicoat® SR 30 D (2.30 g) and 2M aqueous sodium hydroxide solution (0.25 mL). The mixture was gently heated with a heat gun to afford a clear viscous liquid.

The left forearm was treated with Mixture 1 at an application rate of 1 ml per 600 $cm^2$ and the same was done with Mixture 2 on the right forearm. The amount of repellent to be applied was calculated based on the arm measurements (circumference and length) of each participant, taking into account the area to be exposed. Repellent activity was measured exposing the forearm of each participant to the mosquitoes in the cage, 3 minutes every hour for up to 8 h or until the loss of repellent activity was detected counting the number of landings in each exposure period. The first exposure (T1) was one hour after application of the mixture on skin.

A landing occurred when a flying mosquito alighted on the skin without probing or biting. Probing occurred when a mosquito penetrated the skin with her mouthparts without ingesting any blood. When a landing occurred, to prevent the mosquitoes from biting and feeding, participants were allowed to slowly shake their arm or blow slightly.

The Complete Protection Time (CPT) of each mixture was estimated. CPT is the first instance of probing that must be confirmed by a second instance of probing during the same or the subsequent 3-min exposure period.

Landings over time are reported in Table XXIV below.

TABLE XXIV

| Mixture | Volunteer (Gender) | \multicolumn{10}{c}{Mosquito landings observed at time following mixture application} |
|---|---|---|---|---|---|---|---|---|---|---|---|
| | | 1 h | 2 h | 3 h | 4 h | 5 h | 6 h | 7 h | 8 h | 9 h | 10 h |
| 1 | 1 (M) | 0 | 0 | 1 | 5 | 4 | 5 | 7 | 12 | 4 | 10 |
| 1 | 2 (M) | 0 | 0 | 0 | 1 | 4 | 6 | 5 | 2 | 0 | 6 |
| 1 | 3 (F) | 0 | 0 | 0 | 1 | 2 | 4 | 9 | 11 | 2 | 6 |
| 1 | 4 (F) | 0 | 0 | 0 | 0 | 0 | 1 | 2 | 12 | 16 | 10 |
| 2 | 1 (M) | 1 | 1 | 0 | 2 | 1 | 2 | 4 | 2 | 3 | 9 |
| 2 | 2 (M) | 0 | 0 | 0 | 0 | 0 | 0 | 0 | 0 | 1 | 4 |
| 2 | 3 (F) | 0 | 0 | 1 | 0 | 2 | 2 | 2 | 3 | 4 | 4 |
| 2 | 4 (F) | 0 | 0 | 0 | 0 | 0 | 0 | 2 | 2 | 3 | 4 |

Mixture 2 clearly showed a longer mean CPT (4.75 h) compared to mixture 1 (3.25 h). Statistical analysis demonstrated that mixture 2 gave an approximately 50% longer duration than commercial Mosiguard® (mixture 1) at the same applied Citriodiol dose.

No skin irritation was observed from either mixture.

A different batch of an identical Mixture 2 was prepared on a 200 g scale and it was tested with an application at 1.4 mL/600 $cm^2$. It was used a 100 $cm^2$ area of exposed skin and 80 mosquitoes per box in tests run on 10 volunteers over 12 h. The complete protection times were 9, 11, 12, 12, 12, 12, 12, 12, 12, and 9 h, being the mean protection time 11 hours, but this might be higher if the test had been performed for longer.

Example 19: In Vivo Repellent Effect Test

In this example it was performed a comparison of the repellent effect of cis-PMD, methyl-α-glucopyranoside, citric acid, and calcium chloride mixture to trans-PMD, methyl-α-glucopyranoside, citric acid, and calcium chloride mixture by in vivo arm-in-cage testing using *Aedes albopictus* mosquitoes.

Arm-in-cage mosquito tests were performed using essentially the same procedure shown in Example 18 except that 1.5 ml of each mixture was applied to a 600 cm² area of each forearm of four volunteers.

The following mixtures were prepared:
Mixture 1: A mixture of cis-PMD (3.0 g), methyl-α-glucopyranoside (0.64 g), succinic acid (0.64 g) and anhydrous magnesium chloride (0.24 g) were diluted with absolute ethanol (2.92 g), 2 M aqueous sodium hydroxide solution (0.42 g), deionised water (1.30 g) and Kollicoat® SR 30 D (0.3 g). The mixture was gently heated with a heat gun to afford a colourless opaque liquid.
Mixture 2: A mixture of trans-PMD (3.0 g), methyl-α-glucopyranoside (0.64 g). succinic acid (0.64 g) and anhydrous magnesium chloride (0.24 g) were diluted with absolute ethanol (2.92 g), 2 M aqueous sodium hydroxide solution (0.42 g). deionised water (1.30 g) and Kollicoat® SR 30 D (0.3 g). The mixture was gently heated with a heat gun to afford a colourless opaque liquid.

Landings over time are reported in Table XXV below:

TABLE XXV

| Mixture | Volunteer (Gender) | Mosquito landings observed at time following mixture application | | | | | | | |
|---|---|---|---|---|---|---|---|---|---|
| | | 1 h | 2 h | 3 h | 4 h | 5 h | 6 h | 7 h | 8 h |
| 1 | 1 (M) | 1 | 0 | 0 | 1 | 0 | 0 | 0 | 1 |
| 1 | 2 (M) | 1 | 0 | 0 | 0 | 0 | 0 | 1 | 1 |
| 1 | 3 (F) | 1 | 0 | 1 | 1 | 1 | 1 | 2 | 1 |
| 1 | 4 (F) | 0 | 1 | 0 | 0 | 0 | 2 | 1 | 2 |
| 2 | 1 (M) | 0 | 1 | 0 | 2 | 1 | 2 | 4 | 2 |
| 2 | 2 (M) | 0 | 0 | 2 | 0 | 1 | 0 | 0 | 1 |
| 2 | 3 (F) | 1 | 1 | 2 | 0 | 1 | 3 | 2 | 9 |
| 2 | 4 (F) | 1 | 1 | 2 | 4 | 2 | 4 | 6 | 4 |

Mixture 1 showed a longer mean CPT (4 h) compared to mixture 2 (1.75 h). Both mixtures performed similarly towards male volunteers, with Mixture 1 performing very slightly better than Mixture 2 against female volunteers.

No skin irritation was observed from either mixture.

Example 20: In Vivo Repellent Effect Test

In this example, it was performed a simulated long duration testing of a mixture containing a reduced concentration of cis-PMD, cis/trans-PMD, and Citriodiol®, compared to a diluted solution of Mosiguard®, and comparative solutions of cis-PMD and trans-PMD in absolute ethanol, using in vivo arm-in-cage testing using *Aedes albopictus* mosquitoes.

The objective of this experiment was to simulate the repellent effect over a longer duration by comparison of a mixture containing reduced cis-PMD, Citriodiol® and cis/trans-PMD concentration, but not reduced methyl-α-glucopyranoside, succinic acid, magnesium chloride or Kollicoat® SR 30 D concentration, to Mosiguard®, cis-PMD and trans-PMD, where the active ingredient concentration had been diluted to a similar extent with ethanol.

Arm-in-cage mosquito tests were performed using essentially the same procedure shown in Example 18 except that 1.5 ml of each mixture was applied to a 600 cm² area of each forearm of four volunteers.

The following mixtures were prepared:
Mixture 1 (comparative): 4 ml of Mosiguard®, purchased on line through Amazon and was produced by Citrefine and containing a 30 v/v Citriodiol® content according to the label, was diluted with absolute ethanol (6 ml).
Mixture 2: A mixture of cis-PMD (1.44 g), methyl-α-glucopyranoside (1.32 g), succinic acid (1.30 g) and anhydrous magnesium chloride (0.50 g) were diluted with absolute ethanol (9.5 ml), deionised water (5.5 ml) and Kollicoat® SR 30 D (1.2 ml). The mixture was gently heated with a heat gun to afford a colourless opaque liquid.
Mixture 3: A mixture of commercial cis/trans-PMD (1.44 g), methyl-α-glucopyranoside (1.32 g), succinic acid (1.30 g) and anhydrous magnesium chloride (0.48 g) were diluted with absolute ethanol (8.3 ml), deionised water (1.8 ml), Kollicoat® SR 30 D (4.8 ml) and glycerine (1.2 ml). The mixture was gently heated with a heat gun to afford a viscous liquid.
Mixture 4: A mixture of Citriodiol® (1.44 g), methyl-α-glucopyranoside (1.32 g), succinic acid (1.30 g) and anhydrous magnesium chloride (0.48 g) were diluted with absolute ethanol (8.3 ml), deionised water (1.8 ml), Kollicoat® SR 30 D (4.8 ml) and glycerine (1.2 ml). The mixture was gently heated with a heat gun to afford a viscous liquid.
Mixture 5 (comparative): cis-PMD (0.72 g) was dissolved in absolute ethanol (9.6 ml) to give a clear liquid.
Mixture 6 (comparative): Commercial cis/trans-PMD (0.72 g) was dissolved in absolute ethanol (9.6 ml) to give a clear liquid.

Landings over time are reported in Table XXVI below.

TABLE XXVI

| Mixture | Volunteer (Gender) | Mosquito landings observed at time following mixture application | | | | | | | |
|---|---|---|---|---|---|---|---|---|---|
| | | 1 h | 2 h | 3 h | 4 h | 5 h | 6 h | 7 h | 8 h |
| *1* | *1 (M)* | *2* | *8* | *3* | *5* | *12* | *15* | *17* | *28* |
| *1* | *2 (M)* | *6* | *3* | *8* | *5* | *6* | *20* | *18* | *19* |
| *1* | *3 (F)* | *0* | *0* | *7* | *10* | *15* | *16* | *19* | *38* |
| *1* | *4 (F)* | *0* | *0* | *0* | *0* | *15* | *23* | *30* | *26* |
| 2 | 1 (M) | 3 | 0 | 0 | 0 | 6 | 7 | 3 | 4 |
| 2 | 2 (M) | 0 | 1 | 0 | 0 | 0 | 0 | 4 | 2 |
| 2 | 3 (F) | 0 | 3 | 3 | 4 | 6 | 7 | 3 | 4 |
| 2 | 4 (F) | 1 | 0 | 2 | 0 | 0 | 0 | 0 | 0 |
| 3 | 1 (M) | 0 | 1 | 2 | 1 | 4 | 2 | 1 | 5 |
| 3 | 2 (M) | 0 | 0 | 0 | 0 | 0 | 0 | 5 | 6 |
| 3 | 3 (F) | 1 | 3 | 3 | 4 | 7 | 2 | 2 | 6 |
| 3 | 4 (F) | 7 | 1 | 2 | 0 | 1 | 2 | 3 | 2 |
| 4 | 1 (M) | 2 | 3 | 1 | 3 | 8 | 21 | 25 | 12 |
| 4 | 2 (M) | 1 | 1 | 2 | 1 | 0 | 4 | 10 | 0 |
| 4 | 3 (F) | 0 | 0 | 0 | 2 | 5 | 2 | 9 | 8 |
| 4 | 4 (F) | 6 | 1 | 0 | 0 | 0 | 0 | 0 | 0 |
| *5* | *1 (M)* | *0* | *0* | *1* | *2* | *2* | *3* | *0* | *2* |
| *5* | *2 (M)* | *1* | *0* | *7* | *6* | *9* | *16* | *22* | *21* |
| *5* | *3 (F)* | *0* | *0* | *0* | *3* | *3* | *10* | *13* | *10* |
| *5* | *4 (F)* | *0* | *0* | *4* | *14* | *12* | *27* | *57* | *58* |
| *6* | *1 (M)* | *0* | *0* | *1* | *15* | *1* | *2* | *6* | *7* |
| *6* | *2 (M)* | *0* | *1* | *1* | *4* | *3* | *9* | *12* | *10* |
| *6* | *3 (F)* | *0* | *5* | *4* | *9* | *1* | *11* | *10* | *21* |
| *6* | *4 (F)* | *0* | *2* | *1* | *5* | *6* | *6* | *29* | *47* |

(Comparative mixtures are shown italics, and mixtures of the invention in bold)

Mixture 2 clearly showed a slower degradation in repellent activity compared to Mixture 5, demonstrating that cis-PMD, when formulated with methyl-α-glucopyranoside, succinic acid and magnesium chloride according to the invention, gave a significant positive impact on cis-PMD repellent performance in vivo compared to the same concentration of cis-PMD formulated in a traditional manner (in alcohol). Mixture 3 clearly showed a slower degradation in repellent activity compared to Mixture 6, demonstrating that cis/trans-PMD, when formulated with methyl-α-glucopyranoside, succinic acid and magnesium chloride according to the invention, gave a significant positive impact on cis/trans-PMD repellent performance in vivo compared to the same concentration of cis/trans-PMD formulated in a traditional manner (in alcohol). On average, Mixture 4 clearly showed a slower degradation in repellent activity compared to Mixture 1, demonstrating that Citriodiol®, when formulated with methyl-α-glucopyranoside, succinic acid and magnesium chloride according to the invention, gave a significant positive impact on Citriodiol® repellent performance in vivo compared to the same concentration of Citriodiol® formulated in a traditional manner (diluted Mosiguard®).

Example 21: In Vivo Repellent Effect Test

In this example it was performed a comparison of the repellent effect of cis-PMD, methyl-α-glucopyranoside, citric acid, and calcium chloride mixture with and without pH adjustment by in vivo arm-in-cage testing using *Aedes albopictus* mosquitoes.

Arm-in-cage mosquito tests were performed using essentially the same procedure shown in Example 18 except with 1 ml of each mixture was applied to a 600 cm² area of each forearm of four volunteers.

The following mixtures were prepared:
Mixture 1. A mixture of cis-PMD (1.2 g), methyl-α-glucopyranoside (0.64 g), succinic acid (0.64 g) and anhydrous magnesium chloride (0.24 g) were diluted with absolute ethanol (3.24 g), 2M aqueous sodium hydroxide solution (0.42 g), deionised water (2.50 g) and Kollicoat® SR 30 D (0.30 g). The mixture was gently heated with a heat gun to afford a colourless opaque liquid.
Mixture 2. A mixture of cis-PMD (1.2 g), methyl-α-glucopyranoside (0.64 g), succinic acid (0.64 g) and anhydrous magnesium chloride (0.24 g) were diluted with absolute ethanol (3.56 g), deionised water (2.50 g) and Kollicoat® SR 30 D (0.30 g). The mixture was gently heated with a heat gun to afford a colourless opaque liquid.

Landings over time are reported in Table XXVII below:

TABLE XXVII

| Mixture | Volunteer (Gender) | Mosquito landings observed at time following mixture application | | | | | |
|---|---|---|---|---|---|---|---|
| | | 1 h | 2 h | 3 h | 4 h | 5 h | 6 h |
| 1 | 1 (M) | 1 | 1 | 1 | 2 | 3 | 6 |
| 1 | 2 (M) | 8 | 4 | 6 | 2 | 5 | 5 |
| 1 | 3 (F) | 0 | 0 | 1 | 3 | 6 | 3 |
| 1 | 4 (F) | 0 | 3 | 0 | 2 | 3 | 2 |
| 2 | 1 (M) | 3 | 1 | 5 | 9 | 6 | 12 |
| 2 | 2 (M) | 4 | 1 | 6 | 12 | 10 | 6 |
| 2 | 3 (F) | 2 | 2 | 2 | 3 | 3 | 7 |
| 2 | 4 (F) | 2 | 7 | 6 | 13 | 16 | 12 |

Mixture 1 showed a slightly reduced rate of loss of repellent activity over time than Mixture 2.

No skin irritation was observed from either mixture.

Example 22: Extraction of Pure Racemic cis/trans-PMD From Citriodiol® and Subsequent Selective Crystallisation of Racemic cis-PMD Citriodiol® (30.0 g) was dissolved in hexanes (200 ml). Ethanol (0.10 ml) was added followed by anhydrous calcium chloride (19.3 g, approximately 1.4 equiv. relative to total PMD in the Citriodiol®) and the mixture stirred vigorously for 4 hours at room temperature. The mixture was filtered and the white solid residue washed with hexanes (20 ml). The residue was then dissolved into a mixture of water (100 ml) and hexanes (100 ml), the aqueous phase was removed by separation and the organic phase dried over anhydrous sodium sulphate and the solvent removed by distillation under reduced pressure to afford racemic cis/trans-PMD (20.8 g, approximately 99% recovery based on total PMD in the Citriodiol®). The product was identical to authentic cis/trans-PMD by ¹H-NMR and contained essentially the same cis/trans-ratio as in the starting Citriodiol® (approximately 6:4 cis/trans-PMD). Anhydrous magnesium chloride could also be used in place of anhydrous calcium chloride to give essentially the same results.

Racemic cis/trans-PMD (100.0 g) were dissolved in ethyl acetate (15 ml) on heating to 70° C. Hexane (30 ml) was added dropwise and the solution to cool to room temperature and then further cooled to 15° C. Stirring was continued for 3 hours and the mixture filtered to afford racemic cis-PMD (33.0 g, approximately 53% based on the cis-PMD present in the starting material) as a white solid. The material was identical to authentic cis-PMD by ¹H-NMR.

Similar results were obtained by recrystallisation used 10 volumes of heptane relative to starting material.

The invention claimed is:
1. A slow-release formulation, comprising:
p-menthane-3,8-diol (PMD),
a glycoside,
an organic acid, and
a divalent metal halide salt.
2. The slow-release formulation according to claim 1, wherein the glycoside is a reducing sugar attached to a non-carbohydrate through a glycosidic linkage, and
wherein the sugar is a monosaccharide, a saccharide with a degree of polymerization of between 1.1 and 1.9, a disaccharide, or a trisaccharide.
3. The slow-release formulation according to claim 2, wherein the reducing sugar is selected from the group consisting of glucose, galactose, allose, altrose, mannose, gulose, idose, tallose, fucose, xylose, 2-deoxyglucose, and N-acetylglucosamine, and mixtures thereof.
4. The slow-release formulation according to claim 3, wherein the glycoside is selected from the group consisting of: a methyl-α-glycoside, hexyl glucoside, phenyl-β-glucoside, geranyl-β-glucoside, and a PMD glucovanillin conjugate.
5. The slow-release formulation according to claim 1, wherein the organic acid is selected from the group consisting of sulfonic acids, monocarboxylic acids, dicarboxylic acids, tricarboxylic acids, hydroxycarboxylic acids, and amino acids.
6. The slow-release formulation according to claim 5, wherein the organic acid is selected from the group consisting of citric acid, succinic acid, and anhydrous or hydrate forms thereof.
7. The slow-release formulation according to claim 1, wherein the divalent metal halide salt is selected from the group consisting of calcium chloride, magnesium chloride, magnesium bromide, zinc iodide, zinc chloride, zinc bromide, and cobalt chloride.
8. The slow-release formulation according to claim 1, wherein the formulation comprises the following per mole of PMD:

between 0.01 and 2 mol of the glycoside,
between 0.05 and 3 mol of the organic acid, and
between 0.01 and 5 mol of the divalent metal halide salt.

9. The slow-release formulation according to claim 4, wherein the methyl-α-glycoside is selected from the group consisting of: a methyl-α-glucoside, methyl-α-glucopyranoside, methyl-α-D-mannopyranoside, and methyl-α-D-galactopyranoside.

10. The slow-release formulation according to claim 1, wherein the divalent metal halide salt is selected from the group consisting of calcium chloride, magnesium chloride, and zinc chloride.

11. The slow-release formulation according to claim 10, wherein the divalent metal halide salt is calcium chloride.

12. The slow-release formulation according to claim 10, wherein the divalent metal halide salt is magnesium chloride.

13. The slow-release formulation according to claim 10, wherein the organic acid is selected from the group consisting of citric acid, succinic acid, and anhydrous or hydrate forms thereof.

14. The slow-release formulation according to claim 10, wherein the glycoside is selected from the group consisting of hexyl glucoside and methyl-α-glucopyranoside.

15. The slow-release formulation according to claim 14, wherein the divalent metal halide salt is magnesium chloride, wherein the organic acid is succinic acid, and wherein the glycoside is hexyl glucoside.

16. The slow-release formulation according to claim 15, wherein the formulation comprises the following per mole of PMD:
between 0.05 and 1 mol of the glycoside,
between 0.09 and 1.7 mol of the organic acid, and
between 0.02 and 2 mol of the divalent metal halide salt.

* * * * *